US005243755A

United States Patent [19]

Inaba et al.

[11] Patent Number: 5,243,755

[45] Date of Patent: Sep. 14, 1993

[54] INK-JET HEAD ASSEMBLING APPARATUS AND METHOD

[75] Inventors: Masaki Inaba, Kawasaki; Fumio Ichikawa, Kanagawa; Tsunenobu Satoi, Yokohama; Hiroshi Haruyama, Yokohama; Tsuyoshi Baba, Yokohama; Tsuyoshi Orikasa, Kasukabe; Takashi Ohba, Zama, all of Japan

[73] Assignee: Canon Kabushiki Kaisha, Tokyo, Japan

[21] Appl. No.: 785,508

[22] Filed: Oct. 30, 1991

[30] Foreign Application Priority Data

| | | | |
|---|---|---|---|
| Nov. 2, 1990 | [JP] | Japan | 2-295203 |
| Nov. 2, 1990 | [JP] | Japan | 2-295207 |
| Oct. 24, 1991 | [JP] | Japan | 3-277570 |
| Oct. 24, 1991 | [JP] | Japan | 3-277571 |
| Oct. 24, 1991 | [JP] | Japan | 3-277572 |

[51] Int. Cl.[5] .......... B23P 25/00

[52] U.S. Cl. .......... 29/890.1; 29/281.1; 29/281.5; 29/407; 29/458; 29/466; 29/468; 29/559; 29/720; 364/468; 156/351; 156/378

[58] Field of Search .......... 29/890.1, 407, 458, 29/464, 466, 468, 559, 703, 709, 714, 720, 281.1, 281.5; 156/275.5, 351, 378; 269/21, 24; 364/468; 346/140 R, 76 PH

[56] References Cited

U.S. PATENT DOCUMENTS 4,521,787 6/1985 Yokota et al. .......... 346/140 R

FOREIGN PATENT DOCUMENTS 0197723 10/1986 European Pat. Off. .

OTHER PUBLICATIONS

Huth, M. C., et al., CIM and Machine Vision in the Production of Thermal Inkjet Printheads, Hewlett-Packard Journal, No. 5, Oct. 1988.

Boeller, C. A., et al., High-Volume Microassembly of Color Thermal Inkjet Printheads and Cartridges, Hewlett-Packard Journal, No. 4, Aug. 1988.

*Primary Examiner*—Irene Cuda

*Assistant Examiner*—S. Thomas Hughes

*Attorney, Agent, or Firm*—Fitzpatrick, Cella, Harper & Scinto

[57] ABSTRACT

An ink-jet head assembling apparatus assembles a nozzle head of an ink-jet head for discharging an ink in a predetermined pattern from a heater board having a plurality of heaters for heating the ink, and a top plate member having a plurality of discharge orifices for discharging the ink heated by the corresponding heaters in a jet-like manner. The apparatus is provided with a first position detection mechanism for measuring forming positions of the discharge orifices of said top plate member, a second position detection mechanism for detecting arranging positions of the heaters on said heater board, a position adjustment mechanism for comparing a first detection result detected by said first position detection mechanism with a second detection result detected by said second position detection mechanism, and moving said top plate member relative to said heater board by a shift amount between the two detection results so as to align the positions of the heaters with the positions of the corresponding discharge orifices, and an adhesion mechanism for adhering said top plate member and said heater board aligned by said position adjustment mechanism to each other.

24 Claims, 32 Drawing Sheets

CALIBRATION OPERATION

HEATER BOARD ALIGNING OPERATION

INK-JET HEAD ASSEMBLING APPARATUS AND METHOD

BACKGROUND OF THE INVENTION

The present invention relates to an ink-jet head assembling apparatus for assembling a head nozzle of a printing head for discharging an ink by mounting a top plate member formed with nozzles corresponding to a plurality of heaters on a heater board formed with the heaters.

In recent years, a printing head of so-called bubble-jet type, which heats an ink to form bubbles when an ink is discharged to be printed on a paper sheet, has been developed, and put into practical applications since it is advantageous for improving printing precision.

In an assembling apparatus for assembling a bubble-jet type printing head, heaters for heating an ink, and discharge orifices for discharging bubbles, formed by heating and boiling the ink using the heaters toward, a paper sheet must be precisely aligned on the order of microns. For example, in order to attain printing precision as high as about 360 dpi (dots per inch), 64 discharge orifices must be aligned at a constant pitch within a range of about 4.5 mm, and the aligning pitch in this case is as small as about 70 microns.

Upon formation of discharge orifices at such a very small pitch, the discharge orifices can be formed with allowable predetermined high precision in an orifice plate to be attached to the front surface of a top plate member by using, e.g., an ultra-high-precision process machine such as a laser process machine. On the other hand, upon formation of heaters, the heaters can be similarly formed on a heater board with allowable predetermined high precision by using an ultra-high-precision etching technique.

However, in a conventional assembling apparatus, a heater board and a top plate are respectively set using special-purpose jigs so as to align them, so that the top plate can be placed on the heater board while the axes of heaters on the heater board and discharge orifices formed in the orifice plate precisely coincide with each other. Thereafter, the heater board and the top plate are manually aligned while alternately observing the heaters and orifices using a metal microscope.

In an adhering operation of the heater board and the top plate after alignment, an ultraviolet-setting adhesive is manually applied, the heater board and the top plate are manually pressed against each other, and ultraviolet rays are radiated on the adhesive at the start timing of adhesion, thereby setting the adhesive.

In this manner, such manual alignment results in variations among workers. For example, variations depending on a degree of skill of each worker, and a variation depending on a degree of fatigue of each worker often result. These variations impair position adjustment precision, and pose a problem in reliability of final products. In addition, since visual measurements and manual operations of jigs are repeated, a time required for alignment is prolonged, resulting in a decrease in assembling efficiency caused by a prolonged assembling time. Furthermore, much time is required to train workers until the workers are sufficiently skilled for these tasks.

Workers suffer from eye strain caused by visual measurements over a long period of time, and ultraviolet radiation.

Furthermore, since an adhering operation is manually executed, a worker must hold the two members in a joined state until the adhesive is set, and the relative position between the members may be shifted during holding.

Since a worker must hold the two members over a long period of time, he or she is fatigued considerably, and demand has arisen for improvement of work conditions. In order to shorten an adhesion time, an instantaneous adhesive may be used. However, when an instantaneous adhesive is used, an adhesion force works immediately after the adhesive is applied. For this reason, it is difficult to align the two members while the adhesive is interposed therebetween. In addition, since fine powdery impurities are mixed in a gas of the instantaneous adhesive, the impurities may clogg the finely processed discharge orifices. For these reasons, the instantaneous adhesive cannot be used.

Since ultraviolet rays are employed to set an adhesive, workers must directly see ultraviolet rays in each adhesion process, thus posing a problem of eye strain of workers.

SUMMARY OF THE INVENTION

The present invention has been made in consideration of the above situation, and has as its object to provide an ink-jet head assembling apparatus which can eliminate manual operations, and can realize full-automatic operations, thereby maintaining constant position adjustment precision, and improving reliability.

It is another object of the present invention to provide an ink-jet head assembling apparatus which can eliminate manual operations, and can realize full-automatic operations, thereby shortening a time required for alignment as much as possible, and improving assembling efficiency.

It is still another object of the present invention to provide an ink-jet head assembling apparatus which can eliminate manual operations, and can realize full-automatic operations, so that workers can be free from eye strain caused by visual measurements over a long period of time, and ultraviolet radiation.

It is still another object of the present invention to provide an ink-jet head assembling apparatus which can hold members to be adhered in a predetermined state, and can adhere the members without externally radiating ultraviolet rays.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4(*b*) is a block diagram schematically showing an arrangement of a control portion of the head nozzle;

FIG. 32(*b*) is a block diagram showing an arrangement of a control portion of the head nozzle;

DETAILED DESCRIPTION OF THE PREFERRED EMBODIMENTS

An arrangement of an ink-jet head nozzle assembling apparatus according to an embodiment of the present invention will be described hereinafter.

Ink-jet Cartridge 200 and Head Nozzle 100

A schematic arrangement of an ink-jet cartridge 200 which carries a head nozzle 100 assembled by an assembling apparatus 10 according to the present invention will be described below with reference to FIGS. 1 to 3E.

Figure 1:
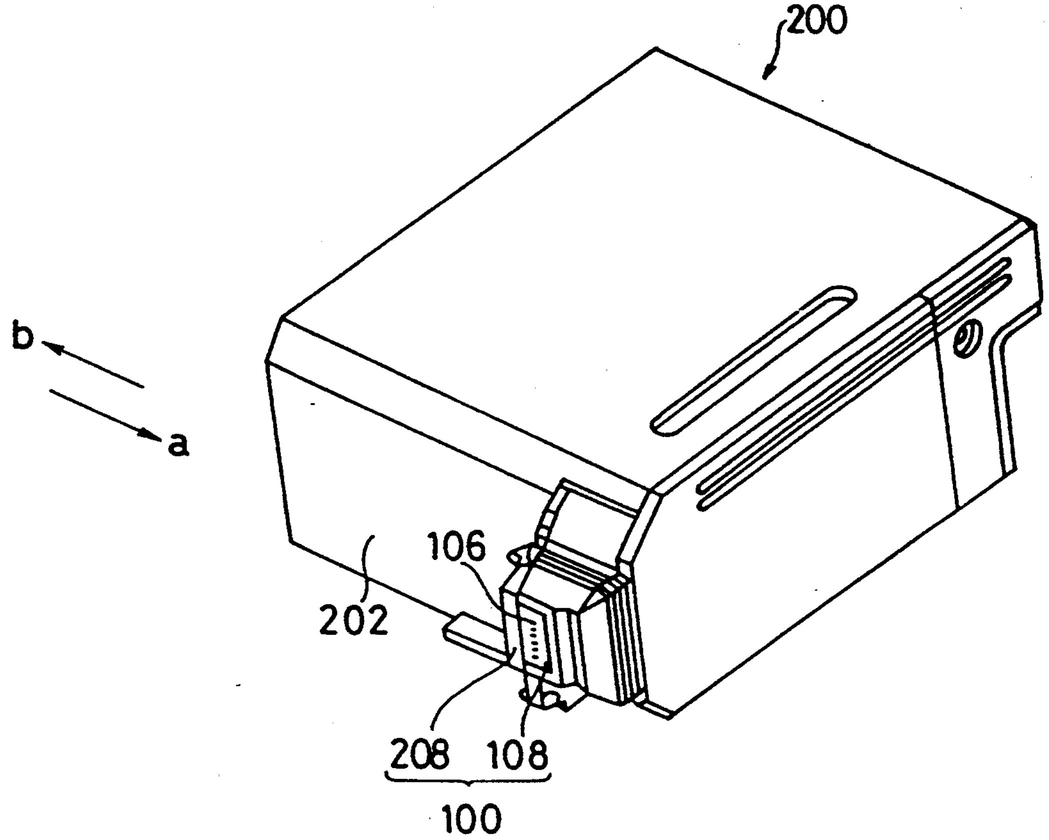
FIG. 1 is a perspective view showing an arrangement of an ink-jet cartridge which is detachably attached to an ink-jet recording apparatus which comprises a head nozzle assembled by an ink-jet head assembling apparatus according to the present invention.
Figure 2:
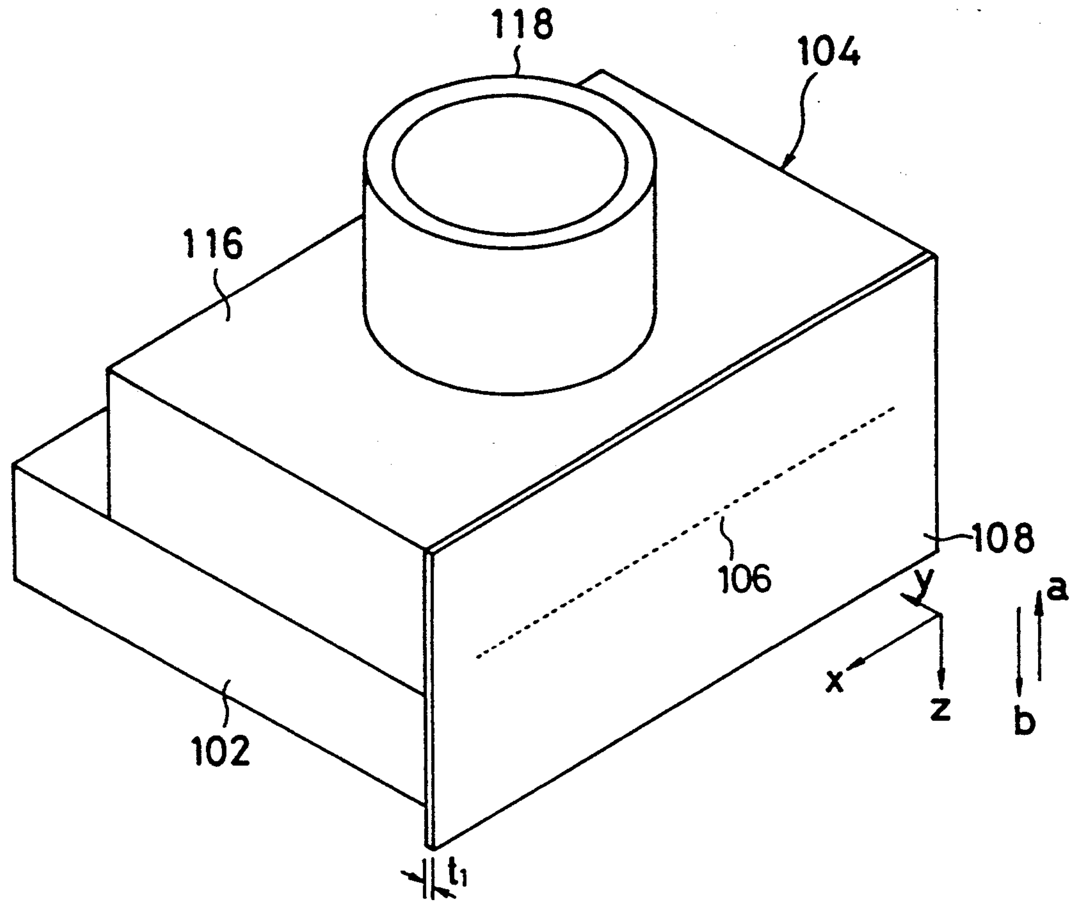
FIG. 2 is a perspective view showing an arrangement of a head nozzle to be assembled by the assembling apparatus of the present invention.
Figure 3A:
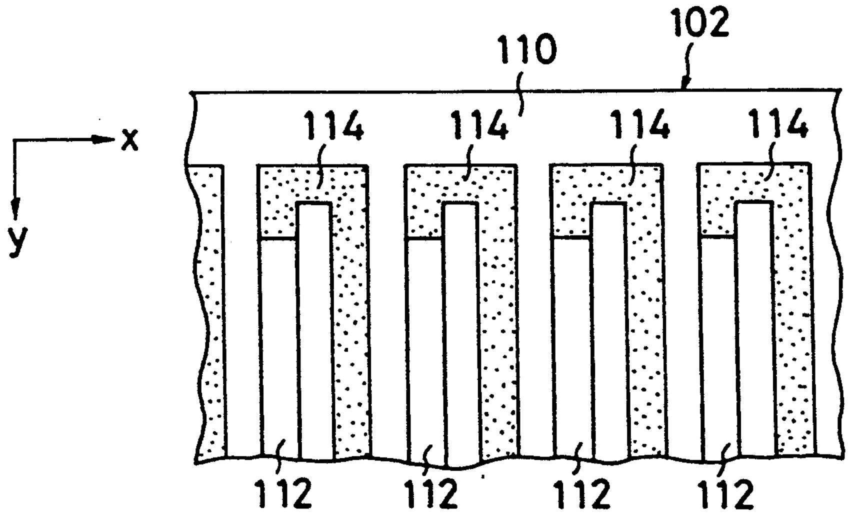
FIG. 3A is a top view showing an arrangement of a heater board for defining one constituting member of the head nozzle.

The ink-jet cartridge 200 is mainly constituted by an ink tank 202 and the head nozzle 100, as shown in FIG. 1. As shown in FIGS. 2 and 3A, the head nozzle 100 is constituted by a heater board 102 on which heaters 112 for heating an ink are formed, a top plate 104 aligned on the heater board 102 and having partition walls for partitioning a plurality of ink channels, a common liquid chamber for distributing an ink to the ink channels, and a cylindrical ink reception port 118 for supplying the ink to the common liquid chamber, and the like, and an orifice plate 108 integrally attached to the front surface of the top plate 104, and having a plurality of discharge orifices 106 corresponding to the ink channels.

In this embodiment, these discharge orifices 106 are aligned at a constant pitch over a length of about 4.5 mm. This aligning pitch defines a printing density of the head nozzle 100 corresponding to a precision as high as about 360 dpi (dots per inch).

A draft is formed on an outer circumferential surface 118*a* of the above-mentioned cylindrical ink reception port 118 so as to facilitate a withdrawing operation in a mold release operation after a molding operation is completed when the top plate 104 is integrally injection-molded using injection-molding metal molds (not shown). More specifically, the cylindrical ink reception port 118 is formed to have the outer circumferential surface 118*a* defined by an inclined surface, so that the diameter of the port is gradually decreased from the proximal end portion toward the distal end portion.

Figure 3B:
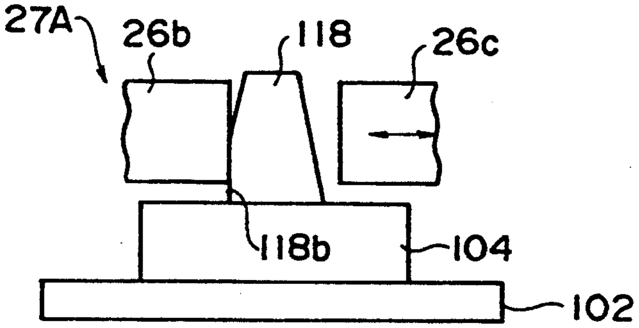
FIG. 3B is a front view for explaining an aligning operation in the x-axis direction of the heater board and a top plate placed thereon.

As will be described in detail later, an attaching mechanism 26 for mounting the top plate 104 on the heater board 102 comprises a first aligning mechanism 27 for precisely aligning the position of the top plate 104 dropped on the heater board 102 with respect to the heater board 102, as shown in FIG. 3B. The first aligning mechanism 27 comprises an x-axis aligning unit 27A for aligning the top plate 104 along the x-axis direction on the heater board 102, i.e., along aligning directions of the discharge orifices 106 and the discharge heaters 112, so that the corresponding discharge orifices 106 and heaters 112 can coincide with each other. In the x-axis aligning unit 27A, a first suction member 26*b* is defined as a reference side, and the inner end face of the suction member 26*b* on the reference side is defined as a position regulating surface. The outer circumferential surface of the ink reception port 118 integrally formed on the top plate 104 is brought into contact with the inner end face (position regulating surface) of the first suction member 26*b*, thereby precisely setting initial positions of the top plate 104 and the heater board 102.

Figure 3C:
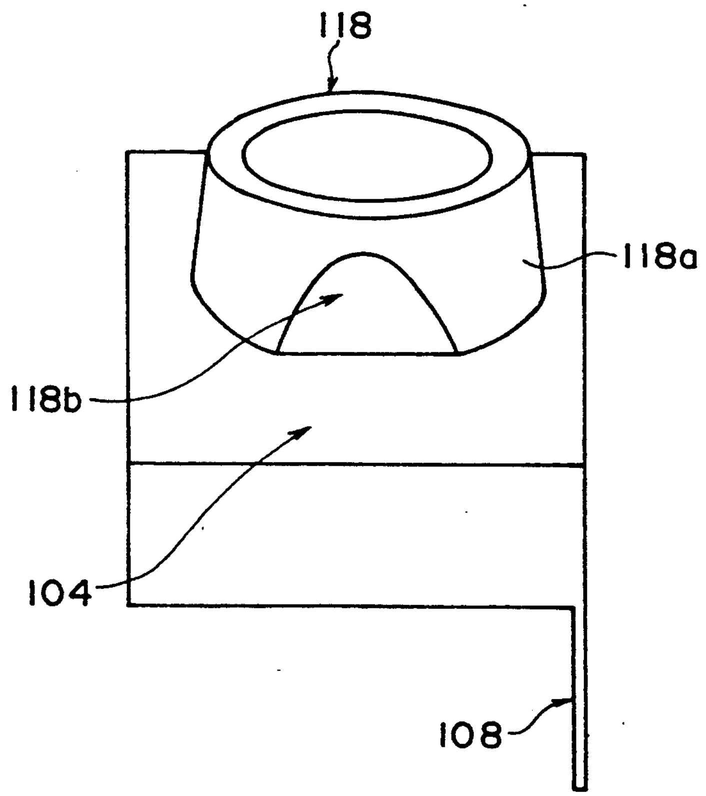
FIGS. 3C to 3E are respectively a perspective view, a front sectional view, and a top view showing a state wherein a contact surface is formed on the outer circumferential surface of a cylindrical ink reception port integrally formed on the top plate.
Figure 3D:
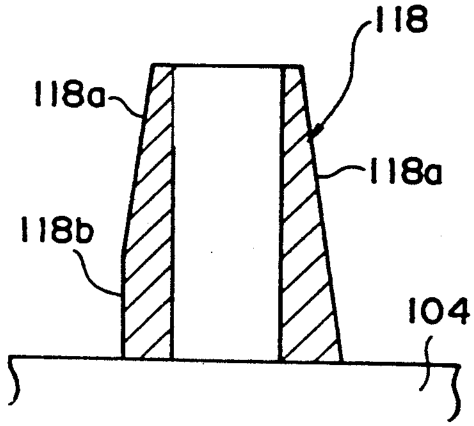
Figure 3E:
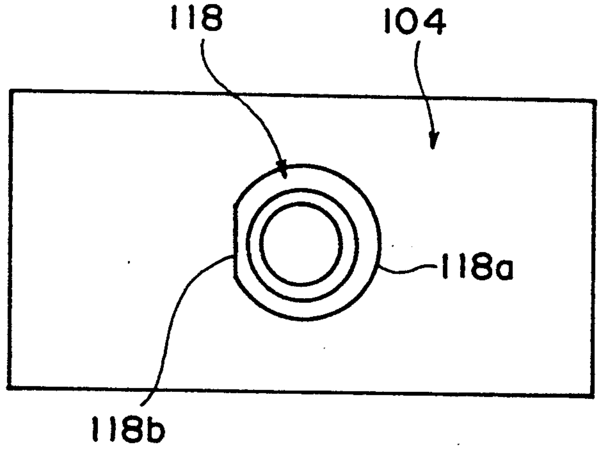

As shown in FIGS. 3C to 3E, a contact surface 118*b* is formed on a portion of the outer circumferential surface 118*a* of the ink reception port 118, which surface is in contact with the position regulating surface of the first suction member 26*b*. The contact surface 118*b* stands upright to be perpendicular to the upper surface of the top plate 104, and is set to be parallel to the position regulating surface, i.e., is set to precisely extend in the y-z plane. When the upright contact surface 118*b* of the ink reception port 118 is brought into contact with the position regulating surface of the first suction member 26*b*, even if a distance in the z-axis direction (i.e., in a height direction) between the top plate 104 dropped and placed on the heater board 102, and the first suction member 26*b* is changed, the initial positions of the heater board 102 and the top plate 104 can be precisely set independently of this distance.

Assembling Apparatus 10

The arrangement of the assembling apparatus 10 of the head nozzle 100 as the characteristic feature of the present invention, i.e., the assembling apparatus 10 for assembling a grooved top plate 104 on a heater board 102 while they are precisely aligned with each other, and an assembling method will be described below with reference to FIG. 4 and the subsequent drawings.

Overall Arrangement of Assembling Apparatus 10

Figure 4A:
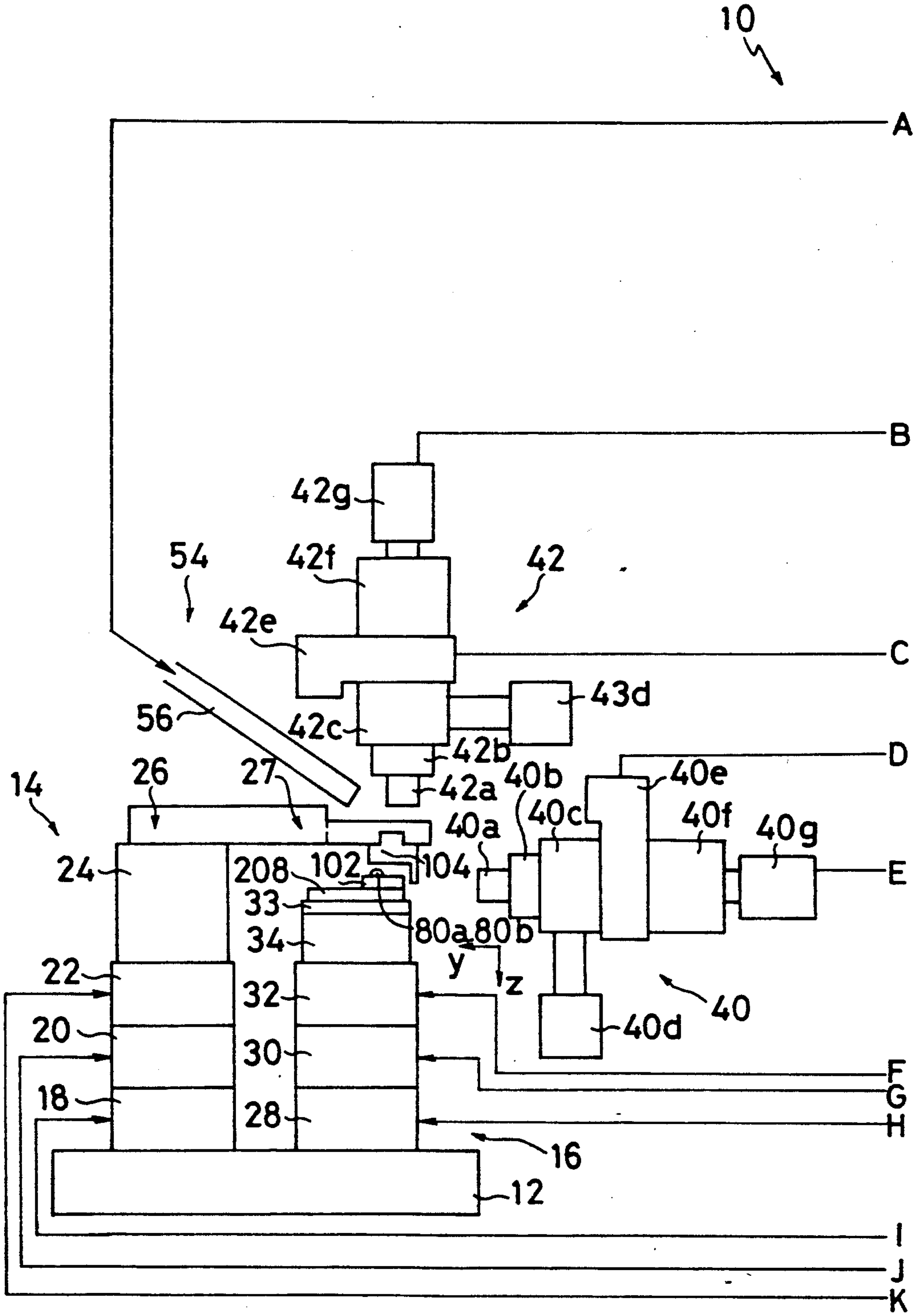
FIG. 4 (*a*) is a schematic diagram showing an arrangement of a mechanical portion of the head nozzle.
Figure 4B:
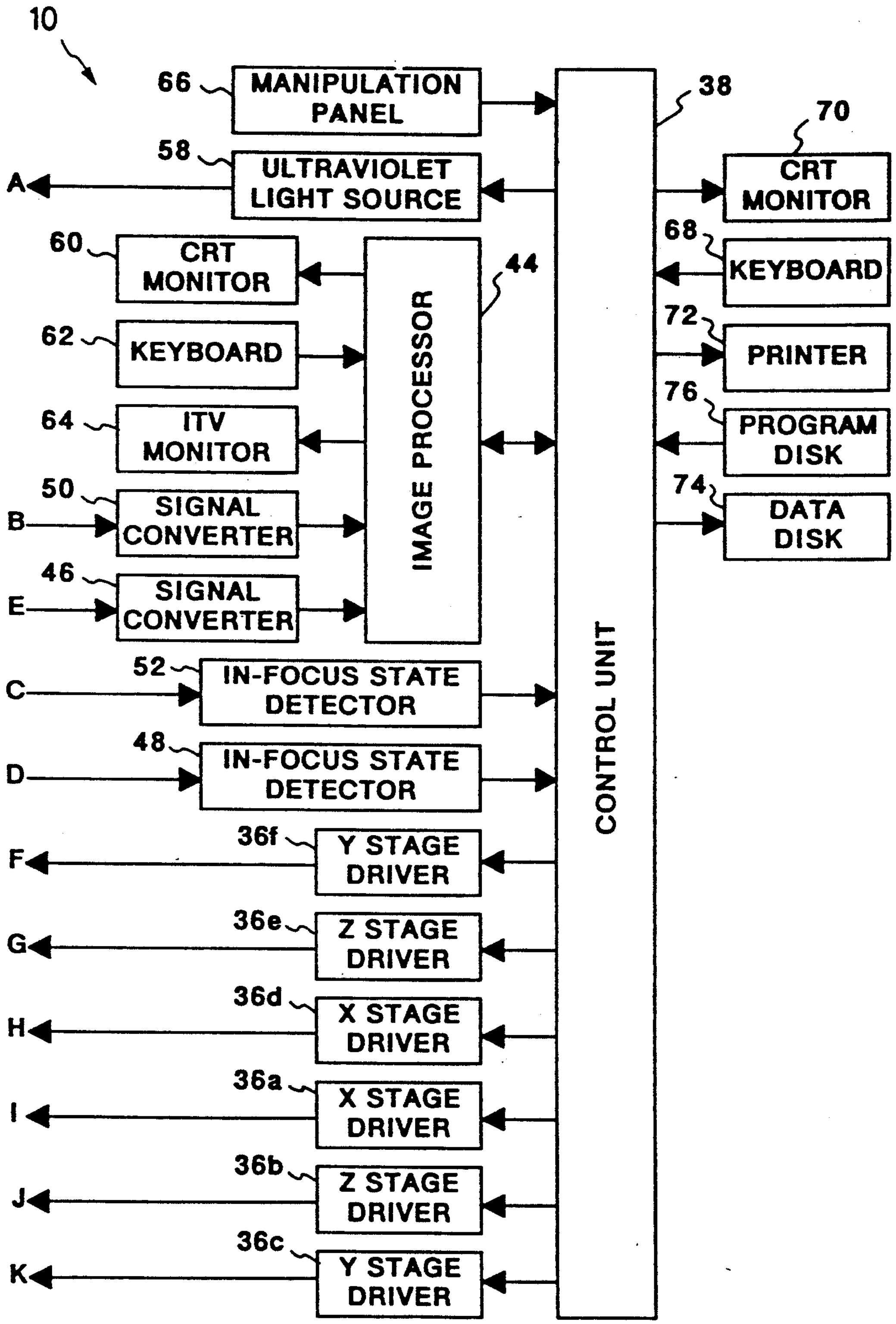

The assembling apparatus 10 comprises a platen 12 which is mounted on a foundation (not shown) to be precisely aligned in a horizontal state, as shown in FIG. 4. First and second position adjustment mechanisms 14 and 16 are arranged on the platen 12. The first position adjustment mechanism 14 adjustably defines the mounting position of the grooved top plate (to be simply referred to as a top plate hereinafter) 104, to which the orifice plate 108 is attached in advance, as one constituting member of the head nozzle 100 to be assembled by the assembling apparatus 10. The second position adjustment mechanism 16 adjustably defines the mounting position of the heater board 102 as the other constituting member, which is precisely aligned and fixed on the upper surface of a distal end portion of a base member 208.

The first position adjustment mechanism 14 comprises a first x-axis stage 18 which is directly placed on the platen 12, and is movable along the x-axis direction (in a direction perpendicular to the drawing surface) with respect to the platen 12, a first z-axis stage 20 which is placed on the first x-axis stage 18, and is movable along the z-axis direction (in an up-and-down direction in FIG. 4) with respect to the first x-axis stage 18, a first y-axis stage 22 which is placed on the first z-axis stage 20, and is movable along the y-axis direction (in a right-and-left direction in FIG. 4) with respect to the first z-axis stage 20, the attaching mechanism 26, the proximal end portion of which is placed on the first y-axis stage 22 via a spacer 24, and on the distal end portion of which the above-mentioned top plate 104 is detachably attached, and the first aligning mechanism 27 for aligning the top plate 104 detached from the attaching mechanism 26 and placed on the heater board 102 with respect to the heater board 102. The arrangements of the attaching mechanism 26 and the first aligning mechanism 27 will be described in detail later.

On the other hand, the second position adjustment mechanism 16 comprises a second x-axis stage 28 which is directly placed on the platen 12 to be adjacent to the first position adjustment mechanism 14, and is movable along the x-axis direction with respect to the platen 12, a second z-axis stage 30 which is placed on the second x-axis stage 28, and is movable along the z-axis direction with respect to the second x-axis stage 28, a second y-axis stage 32 which is placed on the second z-axis stage 30, and is movable along the y-axis direction with respect to the second z-axis stage 30, a second aligning mechanism 33, arranged on the second y-axis stage 32, for fixing the base member 208 to which the heater board 102 is fixed to be precisely aligned with the second y-axis stage 32, and a joint force generating mechanism 34 for causing the top plate 104 to be bonded on the heater board 102 with a predetermined joint force. The arrangements of the second aligning mechanism 33 and the joint force generating mechanism 34 will be described in detail later.

Although not shown, the stages 18, 20, 22, 28, 30, and 32 respectively have drive motors, and these drive motors are connected to a control unit 38 for controlling the overall apparatus via corresponding drivers 36*a*, 36*b*, 36*c*, 36*d*, 36*e*, and 36*f*. These drive motors are driven under the control of the control unit 38, so that the top plate 104 is located at a predetermined position above the heater board 102 in the first position adjustment mechanism 14, and the heater board 102 is located at a predetermined position with respect to the platen 12 in the second position adjustment mechanism 16.

The control unit 38 must precisely detect the position of the top plate 104 so as to precisely align the top plate 104. For this purpose, a first position detection mechanism 40 for precisely detecting the position of the top plate 104 on the basis of an image obtained by photographing the top plate 104 is connected to the control unit 38 via an image processor 44. The control unit 38 must precisely detect the position of the heater board 102 so as to precisely align the heater board 102. For this purpose, a second position detection mechanism 42 for precisely detecting the position of the heater board 102 on the basis of an image obtained by photographing the heater board 102 is connected to the control unit 38 via the image processor 44.

The first position detection mechanism 40 is arranged in front of the orifice plate 108 of the top plate 104 precisely held at the distal end of the attaching mechanism 26 (to be described in detail later). The mechanism 40 comprises a first objective lens 40*a*, a first objective lens holder 40*b* for holding the first objective lens 40*a*, a first projection illumination device 40*c*, a first light source 40*d* for the first projection illumination device 40*c*, a first optical system 40*e* for judging a focusing state, a first lens barrel 40*f* for storing these optical devices, and a first ITV camera 40*g* for photographing an image of the orifice plate 108 observed through the first objective lens 40*a*.

Image data output from the first ITV camera 40*g* is sent to the above-mentioned image processor 44 via a first signal converter 46. The first optical system 40*e* for judging a focusing state is connected to the control unit 38 via a first focusing state detector 48. The first position detection mechanism 40 is mounted and fixed on the platen 12 via a first column (not shown).

The second position detection mechanism 42 is arranged above the heater board 102 which is precisely placed on the second y-axis stage 32 by the second aligning mechanism 33 (to be described in detail later). The mechanism 42 comprises a second objective lens 42a, a second objective lens holder 42b for holding the second objective lens 42a, a second projection illumination device 42c, a second light source 42d for the second projection illumination device 42c, a second optical system 42e for judging a focusing state, a second lens barrel 42f for storing these optical devices, and a second ITV camera 42g for photographing an image of the heater board 102 observed through the second objective lens 42a.

Image data output from the second ITV camera 42g is sent to the above-mentioned image processor 44 via a second signal converter 50. The second optical system 42e for judging a focusing state is connected to the control unit 38 via a second focusing state detector 52. The second position detection mechanism 42 is mounted and fixed on the platen 12 via a second column (not shown).

In this embodiment, an assembling operation position $\alpha$ is defined at a position where the optical axis of the first objective lens 40a in the first position detection mechanism 40 intersects with the optical axis of the second objective lens 42a in the second position detection mechanism 42. At the assembling operation position $\alpha$, it is preferable that the above-mentioned two optical axes correctly intersect with each other. However, even if these axes do not intersect with each other in practice, no problem is posed as long as a calibration operation (to be described later) is executed. In practice, it is very difficult to align the two optical axes, so that the two optical axes correctly intersect with each other. Thus, under a condition that the two optical axes do not intersect with each other like in this embodiment, a shift amount $\Delta x$ between the two optical axes is calculated by the calibration operation, and the calculated shift amount $\Delta x$ is numerically taken into consideration in the position adjustment operations in the first and second position adjustment mechanisms 14 and 16. As a result, the shift amount $\Delta x$ can be substantially ignored. Note that the calibration operation for calculating the shift amount $\Delta x$ will be described in detail later.

The assembling apparatus 10 comprises a temporary adhering mechanism 54. The temporary adhering mechanism 54 adheres the heater board 102 and the top plate 104 via an ultraviolet-setting adhesive after the discharge orifices 106 and the corresponding discharge heaters 112 are aligned with each other, so that the relative positional relationship therebetween is left unchanged, in other words, the heater board 102 and the top plate 104 are temporarily adhered to each other. The temporary adhering mechanism 54 comprises a pair of light guides 56, which are located on the two sides of the distal end portion of the attaching mechanism 26, so that their distal ends are directed toward an adhesive applied portion, and an ultraviolet light source 58, connected to the proximal end portions of the two light guides 56, for emitting ultraviolet rays.

The image processor 44 calculates the positions of the discharge orifices 106 formed in the orifice plate 108, and the positions of the discharge heaters 112 arranged on the heater board 102 on the basis of image data obtained from the first and second ITV cameras 40g and 42g via the first and second signal converters 46 and 50, and sends the calculation results to the control unit 38. The image processor 44 is connected to an ITV monitor 64 for checking measured images, a keyboard 62 for inputting an apparatus adjustment program, and data, and a CRT monitor 60 for displaying data, thus establishing a man-machine interface.

The control unit 38 calculates data input from the first and second focusing state detectors 48 and 52, and the image processor 44 in a predetermined algorithm, and appropriately controls the drive operations of the corresponding stages 18, 20, 22, 28, 30, and 32 via the stage drivers 36a to 36f on the basis of the calculation results, thereby adjusting the relative position between the top plate 104 and the heater board 102, so that the discharge orifices 106 coincide with the corresponding discharge heaters 112. After the orifices and the heaters coincide with each other, the control unit 38 starts the temporary adhering mechanism 54 to operate the ultraviolet light source 58, and executes a control operation for setting an adhesive interposed between the heater board 102 and the top plate 104.

The control unit 38 is connected to a manipulation panel 66 for manipulating the assembling apparatus 10, a keyboard 68 for setting and changing an operation program, a CRT monitor 70 for displaying data, a printer 72 for recording data, a data disk 74 for storing data, and a program disk 76 for storing the operation program, thus establishing a man-machine interface.

Attaching Mechanism 26

The attaching mechanism 26 to which the top plate 104 is attached will be described in detail below with reference to FIG. 5.

The attaching mechanism 26 comprises a main body 26a mounted and fixed on the above-mentioned first y-axis stage 22 via the spacer 24. A pair of parallel suction members 26b and 26c are arranged with a predetermined interval therebetween on the distal end portion of the main body 26a to project forward (in the y-axis direction). These suction members 26b and 26c are formed of ultraviolet transmission members, more specifically, transparent glass plates.

Suction holes 26d and 26e are respectively open to the lower surfaces of these suction members 26b and 26c. The suction holes 26d and 26e are respectively defined by openings at the end portions of communication pipes 26f and 26g extending through the corresponding suction members 26b and 26c, and are selectively connected to a negative pressure generation mechanism and a positive pressure generation mechanism via (neither are shown) via selector valves (not shown).

When the selector valves are connected to the negative pressure generation mechanism, the top plate 104 is held by suction on the lower surfaces of the suction members 26b and 26c via suction forces generated in these suction holes 26d and 26e. On the other hand, when the selector valves are connected to the positive pressure generation mechanism, the top plate 104 held by suction on the suction members 26b and 26c so far is forcibly released downward from the suction members 26b and 26c by air ejected (reversely ejected) from these suction holes 26d and 26e.

In this manner, when the top plate 104 is held by suction on the lower surfaces of the pair of suction members 26b and 26c, the cylindrical ink reception port 118 of the top plate 104 is just fitted between the suction members 26b and 26c, and the orifice plate 108 faces forward.

First Aligning Mechanism 27

The attaching mechanism 26 comprises the first aligning mechanism 27 for precisely aligning the position of the top plate 104, which is released from the attaching mechanism 26, and is dropped on the heater board 102, with respect to the heater board 102.

The first aligning mechanism comprises the x-axis aligning unit 27A for aligning the top plate 104 along the x-axis direction of the heater board 102, i.e., along the aligning directions of the discharge orifices 106 and the discharge heaters 112, so that the corresponding discharge orifices 106 and the discharge heaters 112 coincide with each other, and a y-axis aligning unit 27B for aligning the top plate 104 along the y-axis direction, so that the rear surface of the orifice plate 108 is brought into tight contact with the front end face of the heater board 102.

X-axis Aligning Unit 27A

Figure 5:
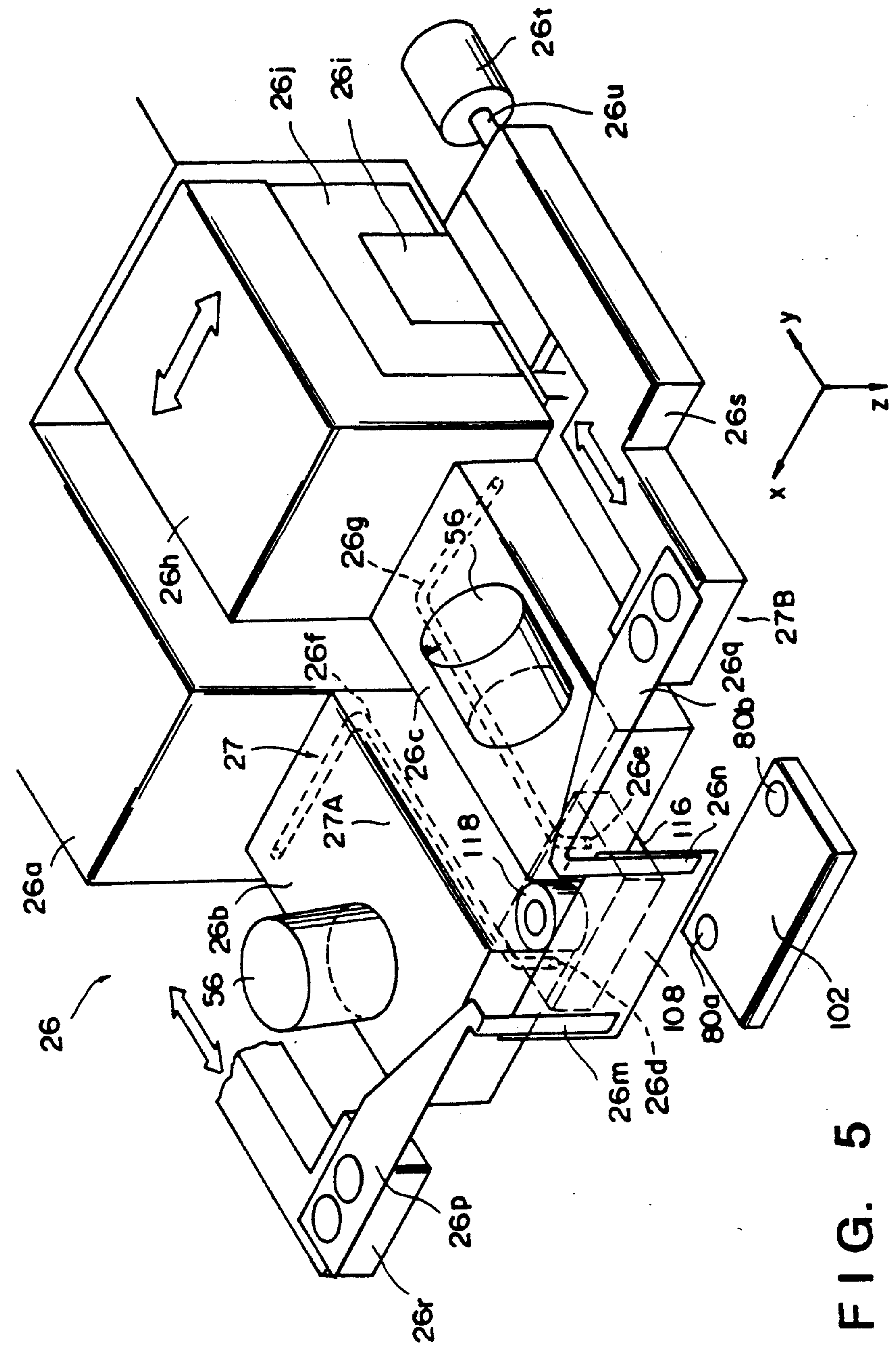
FIG. 5 is a schematic perspective view showing an arrangement of an attaching mechanism and a first aligning mechanism in a first position adjustment mechanism.

In the x-axis aligning unit 27A, the first suction member 26b on the far side in FIG. 5 is defined as a reference side in this embodiment, and the suction member 26b on the reference side is fixed to the main body 26a. In contrast to this, the second suction member 26c on the near side in FIG. 5 is supported on the main body 26a to be movable along the x-axis direction. In the x-axis aligning unit 27A, the opposing end faces of the pair of suction members 26b and 26c, i.e., the opposing end faces for defining a space, in which the cylindrical ink reception port 118 is fitted, therebetween, are defined as position regulating surfaces.

A connection member 26h extending to an intermediate portion of the main body 26a is integrally connected to the rear portion of the movable suction member 26c. On the other hand, a guide shaft 26i extending along the x-axis direction is mounted on the main body 26a. The connection member 26h is supported on the guide shaft 26i via a slide guide 26j to be movable in the x-axis direction.

A first drive cylinder (not shown) is mounted on the main body 26a to oppose an intermediate portion of the connection member 26h. A piston rod of the first drive cylinder is projected/retracted along the x-axis direction, and its distal end is connected to the above-mentioned connection member 26h.

In this manner, when the first drive cylinder reciprocally drives the corresponding piston rod at high speed, the suction member 26c connected via the connection member 26h is reciprocally driven, i.e., vibrated at high speed in the x-axis direction.

Y-axis Aligning Unit 27

As shown in FIG. 5, the y-axis aligning unit 27B comprises a pair of parallel engaging pieces 26m and 26n which extend downward to be separated from each other by a given interval. The engaging pieces 26m and 26n can be engaged with the front surface of the orifice plate 108 of the top plate 104 placed on the heater board 102. The engaging pieces 26m and 26n are arranged in correspondence with the pair of suction members 26b and 26c so as to be located outside the corresponding position regulating surfaces. The upper ends of these engaging pieces 26m and 26n are connected to the inner end portions of connection pieces 26p and 26q extending to positions outside the outer edges of the suction members 26b and 26c along the upper edges of the front end faces of the corresponding suction members 26b and 26c. The outer end portions of these connection pieces 26p and 26q are mounted on the front end portions of coupling members 26r and 26s extending along the y-axis direction.

Second drive cylinders 26t extending along the y-axis direction are arranged on the two edges of the main body 26a. Piston rods 26u of the second drive cylinders 26t are projected/retracted along the y-axis direction, and their distal ends are respectively coupled to the rear end portions of the above-mentioned coupling members 26r and 26s.

In this manner, when the second drive cylinders 26t reciprocally drive the corresponding piston rods 26u at high speed, the engaging pieces 26m and 26n connected via the connection pieces 26p and 26q are reciprocally driven, i.e., vibrated at high speed in the y-axis direction. Thus, the top plate 104 is aligned in the y-axis direction, so that the orifice plate 108 is brought into tight contact with the front end face of the heater board 102.

Since the attaching mechanism 26 has the above-mentioned arrangement, the top plate 104 held by suction on the pair of suction members 26b and 26c is moved to the predetermined position above the heater board 102 under the drive control of the first position adjustment mechanism 14, and when the top plate 104 is released from the suction force, it is dropped onto the heater board 102. At the dropped position, the x-axis position of the top plate 104 with respect to the heater board 102 is defined upon operation of the x-axis aligning unit 26A. In addition, the y-axis position of the top plate 104 with respect to the heater board 102 is defined upon operation of the y-axis aligning unit 26B. The position adjustment operation in the attaching mechanism 26 will be described in detail later.

Second Aligning Mechanism 33

The arrangement of the second aligning mechanism 33 for precisely aligning and attaching the base member 208, to which the heater board 102 is attached in advance, onto the second y-axis stage 32 will be described below with reference to FIGS. 6 to 8.

The second aligning mechanism 33 comprises an x-axis aligning unit 33A for aligning the base member 208 on the second y-axis stage 32 in the x-axis direction, and a y-axis aligning unit 33B for aligning the base member 208 in the y-axis direction like in the first aligning mechanism 27, and also comprises a z-axis aligning unit 33C for aligning the base member 208 in the z-axis direction.

Figure 6:
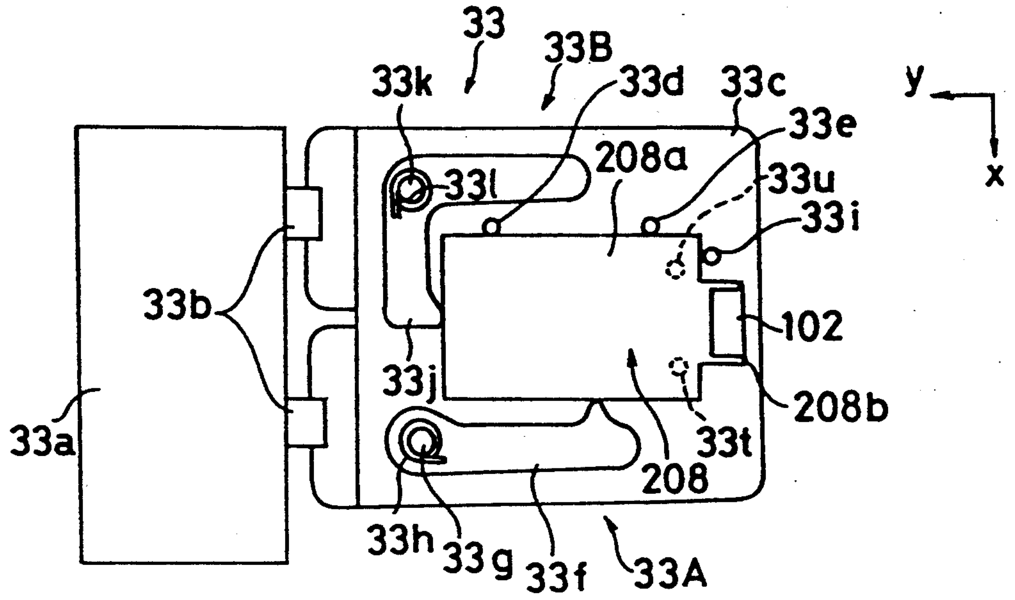
FIG. 6 is a top view showing an arrangement of a second aligning mechanism in a second position adjustment mechanism.

As is apparent from FIG. 6, the base member 208 to be aligned by the second aligning mechanism 33 is integrally formed by a rectangular main body portion 208a, and a heater board attaching portion 208b which projects forward from the central portion of the front edge of the main body portion 208a, and on the upper surface of which the heater board 102 is attached and fixed.

Note that the heater board 102 is attached and fixed in advance on the heater board attaching portion 208b with predetermined precision. Therefore, when the base member 208 to which the heater board 102 is attached is aligned with the second y-axis stage 32, the heater board 102 is aligned with the second y-axis stage 32.

Figure 7:
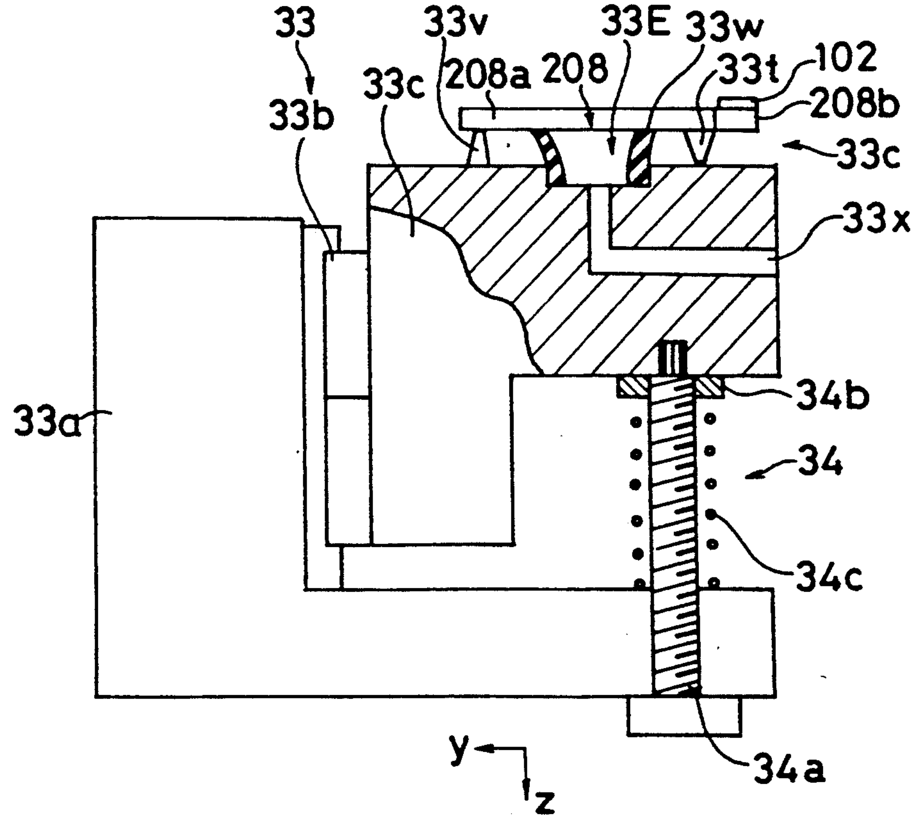
FIG. 7 is a side sectional view showing an arrangement of a bonding force generating mechanism together with the second aligning mechanism.

More specifically, the second aligning mechanism 33 comprises an attaching main body 33*a* mounted on the second y-axis stage 32, and having an L-shaped side surface, and an aligning base 33*c* vertically movably supported on the upright inner surface of the main body 33*a* via a slide guide 33*b*, as shown in FIGS. 6 and 7.

X-axis Aligning Unit 33A

A pair of upward x-axis aligning projections 33*d* and 33*e* are integrally formed on the aligning base 33*c* to be juxtaposed in the y-axis direction to serve as the x-axis aligning unit 33A, as shown in FIG. 6. When one side edge along the y-axis of the main body portion 208*a* of the base member 208 is brought into contact with these x-axis aligning projections 33*d* and 33*e*, the x-axis position of the base member 208 is uniquely defined, i.e., the base member 208 is aligned in the x-axis direction.

In order to force a state wherein one side edge along the y-axis of the main body portion 208*a* of the base member 208 is brought into contact with these x-axis aligning projections 33*d* and 33*e*, an x-axis regulating lever 33*f* is arranged to be able to be in contact with the other side edge opposite to one side edge of the base member 208, which one side edge is in contact with the x-axis aligning projections 33*d* and 33*e*. The proximal end portion of the x-axis regulating lever 33*f* is axially supported to be pivotal about a first support shaft 33*g*. The lever 33*f* receives a pivoting biasing force in a counterclockwise direction in FIG. 7 by a first torsion spring 33*h*. Note that the distal end as a contact end of the x-axis regulating lever 33*f* is in contact with substantially the central portion of the other side edge of the base member 208.

Y-axis Aligning Unit 33B

An upward y-axis aligning projection 33*i* is integrally formed on the aligning base 33*c* to be adjacent to one x-axis aligning projection 33*e* to serve as the y-axis aligning unit 33B. When the front edge along the x-axis of the main body portion 208*a* of the base member 208 whose x-axis position is defined in advance is brought into contact with the y-axis aligning projection 33*i*, the y-axis position of the base member 208 is uniquely defined, i.e., the base member 208 is aligned in the y-axis direction.

In order to force a state wherein the front edge along the x-axis of the main body portion 208*a* of the base member 208 is brought into contact with the y-axis aligning projection 33*i*, a substantially L-shaped y-axis regulating lever 33*j* is arranged to be able to be in contact with the rear edge opposite to the front edge of the base member 208, which front edge is in contact with the y-axis aligning projection 33*i*. An intermediate portion (i.e., a bent portion constituting an L shape) of the y-axis regulating lever 33*j* is axially supported to be pivotal about a second support shaft 33*k*. The lever 33*j* receives a pivoting biasing force in a counterclockwise direction in FIG. 7 by a second torsion spring 33*l*. Note that the rear end as a contact end of the y-axis regulating lever 33*j* is in contact with substantially the central portion of the rear edge of the base member 208.

When the base member 208 is attached/detached to/from the aligning base 33*c*, the biasing forces of the x- and y-axis levers 33*f* and 33*j* must be released. For this purpose, in this embodiment, a release mechanism 33D is arranged.

Figure 8:
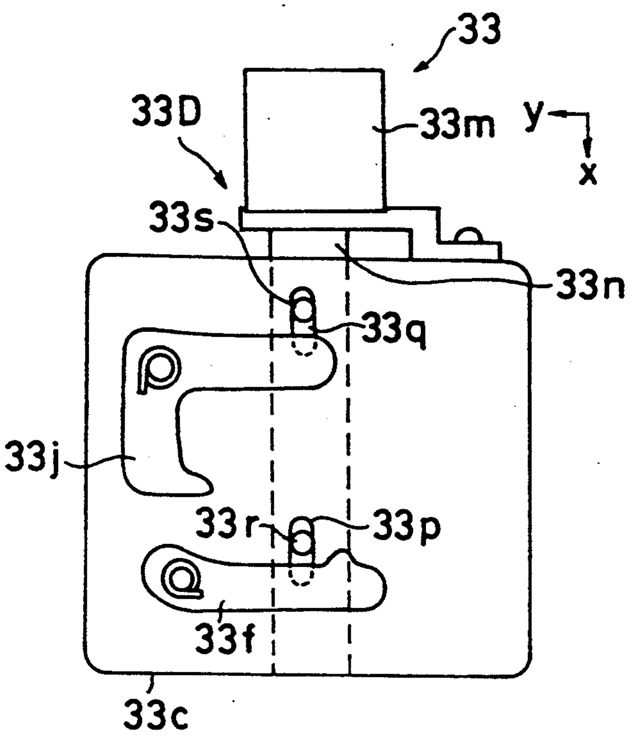
FIG. 8 is a top view showing an arrangement of a release mechanism in the second aligning mechanism.

As shown in FIG. 8, the release mechanism 33D comprises a release cylinder 33*m* arranged on one side edge of the aligning base 33*c*, a piston rod 33*n* projecting from the release cylinder 33*m* to be reciprocal along the x-axis direction, and extending through the aligning base 33*c*, and a pair of release pins 33*r* and 33*s*, which stand upright on the piston rod 33*n*, slightly project from the upper surface of the aligning base 33*c* via through holes 33*p* and 33*q* formed in the aligning base 33*c* to extend along the x-axis direction, and can be respectively brought into contact with the x- and y-axis regulating levers 33*f* and 33*j* from the clockwise direction side.

In the release mechanism 33D, the release cylinder 33*m* biases the piston rod 33*n* to be set in a retracted state in a non-release state. As a result, the pair of release pins 33*r* and 33*s* are separated from the corresponding x- and y-axis regulating levers 33*f* and 33*j*. In this manner, in the non-release state, the x- and y-axis regulating levers 33*f* and 33*j* are pivoted counterclockwise by the biasing force from the corresponding torsion springs 33*h* and 33*l*, thereby aligning and holding the base member 208.

In a release state, the release cylinder 33*m* biases the piston rod 33*n* in a projecting state. As a result, the pair of release pins 33*r* and 33*s* are brought into contact with the corresponding x- and y-axis regulating levers 33*f* and 33*j*, and pivot them clockwise against the biasing forces of the corresponding torsion springs 33*h* and 33*l*. Therefore, the contact ends of the x- and y-axis regulating levers 33*f* and 33*j* are respectively separated from the other side edge and the rear edge of the base member 208, thereby releasing the aligning/holding operation of the base member 208.

Z-axis Aligning Unit 33C

As shown in FIG. 7, the above-mentioned z-axis aligning unit 33C is formed with a pair of first and second projections 33*t* and 33*u* (although FIG. 7 illustrates only the first projection 33*t*, the arranging positions of the first and second projections 33*t* and 33*u* are indicated by broken lines in FIG. 6) which are juxtaposed in the x-axis direction on the lower surface of the distal end portion of the base member 208 to project downward, and a third projection 33*v* formed on the central portion of the upper surface of the rear end portion of the aligning base 33*c* to project upward.

The projecting lengths of these first to third projections 33*t* to 33*v* are precisely defined to be equal to each other. As a result, when the first and second projections 33*t* and 33*u* are brought into contact with the upper surface of the aligning base 33*c*, and the third projection 33*v* is brought into contact with the lower surface of the base member 208, the z-axis position of the base member 208 on the aligning base 33*c* is precisely defined.

In this embodiment, in order to reliably establish the above-mentioned contact states, a suction mechanism 33E for drawing the base member 208 toward the aligning base 33*c* by suction is arranged. As shown in FIG. 7, the suction mechanism 33E is constituted by a suction pad 33*w* arranged on the aligning base 33*c*, and having an upper surface opening, and a connection pipe 33*x* extending through the aligning base 33*c* so as to connect the suction pad 33*w* and a suction source (not shown).

The height of the suction pad 33*w* is slightly larger than the heights of the above-mentioned three projections 33*t*, 33*u*, and 33*v*. As a result, the overall opening edge of the suction pad 33*w* is in tight contact with the lower surface of the base member 208, while the base member 208 is placed on the aligning base 33*c*. When the suction source (not shown) is started, the base member 208 is forcibly drawn toward the aligning base 33*c*. As a result, a state wherein the first and second projections 33*t* and 33*u* are reliably in contact with the upper surface of the aligning base 33*c*, and the third projection 33*v* is reliably in contact with the lower surface of the base member 208 is forcibly set.

Since the second aligning mechanism 33 has the arrangement described above, the x-, y-, and z-axis positions of the base member 208 are precisely aligned on the aligning base 33*c*. As a result, in this embodiment, when the top plate 104 is mounted on the heater board 102, the position of the top plate 104 relative to the heater board 102 need only be defined via the first aligning mechanism 27.

In the above-mentioned description of the z-axis aligning unit 33C, the pair of projections 33*t* and 33*u*, which are juxtaposed in the x-axis direction on the lower surface of the distal end portion of the base member 208 to project downward, serve as references upon the z-axis aligning operation of the base member 208 on the second y-axis stage 32. The pair of projections 33*t* and 33*u* are used not only in the z-axis aligning operation of the base member 208 on the y-axis stage 32, but also serve as aligning members used when an assembly of the heater board 102 and the top plate 104 assembled in an integrated state by the assembling apparatus 10, i.e., the head nozzle 100, is precisely assembled at a predetermined position of the ink tank 202, as will be described later.

More specifically, when the head nozzle 100 is mounted on a predetermined mounting surface of the ink tank 202, the head nozzle 100 is attached on a process jig of a process machine (not shown), and the lower ends of the projections 33*t* and 33*u* are cut, so that distances between a reference position (i.e., the discharge orifices 106 formed in the orifice plate 108 of the top plate 104 constituting the head nozzle 100) and the lower ends of the projections 33*t* and 33*u* have predetermined values. In this manner, the head nozzle 100 placed on the predetermined mounting surface of the ink tank 202 can have the precisely constant heights between the two projections 33*t* and 33*u* and the discharge orifices 106.

As a result, in every head nozzle 100 assembled on the predetermined mounting surface of the ink tank 202, the height positions of the discharge orifices 106 with respect to the predetermined mounting surface can be precisely defined. Therefore, when the ink-jet cartridge 200 constituted by the head nozzle 100 and the ink tank 202 is assembled in, e.g., a printer apparatus (not shown), and is subjected to a print operation, the setting positions of the discharge orifices 106, i.e., print positions can be constant for all the ink-jet cartridges 200, thus maintaining high print quality.

Joint Force Generating Mechanism 34

The joint force generating mechanism 34 for, when the top plate 104 is aligned and placed on the heater board 102, generating a joint force therebetween will be described below with reference to FIG. 7.

The joint force generating mechanism 34 comprises a guide shaft 34*a* extending through the distal end portion of the above-mentioned main body 33*a* to be vertically movable. The upper end of the guide shaft 34*a* is fixed to the lower surface of the aligning base 33*c*. A washer 34*b* for adjusting a joint force is threadably engaged with the upper end portion of the guide shaft 34*a*. When the washer 34*b* is rotated, the axial position of the washer 34*b* with respect to the guide shaft 34*a* is changed.

A coil spring 34*c* for generating a joint force is wound around the outer circumferential surface of the guide shaft 34*a*. The upper end of the coil spring 34*c* is locked with the lower surface of the washer 34*b*, and its lower end is locked with the upper surface of the main body 33*a*. The coil spring 34*c* is contracted to some extent since it supports the weights of the aligning base 33*c* and components placed thereon. When the coil spring 34*c* is further contracted by a predetermined amount from an initial state wherein it is contracted to some extent, it produces a predetermined elastic repulsion force, and this elastic repulsion force is defined as the joint force.

Since the joint force generating mechanism 34 has the arrangement as described above, when the top plate 104 is placed on the heater board 102, the top plate 104 is pressed against the heater board 102, so that the aligning base 33*c* on which the heater board 102 is aligned and placed is moved downward by the predetermined amount. As a result, the predetermined joint force is produced between the top plate 104 and the heater board 102.

Note that the joint force can be changed as follows. That is, the washer 34*b* is rotated to be displaced along the axial direction of the guide shaft 34*a*, thereby changing the initial length of the coil spring 34*c*.

Calibration Chart 78

Figure 9:
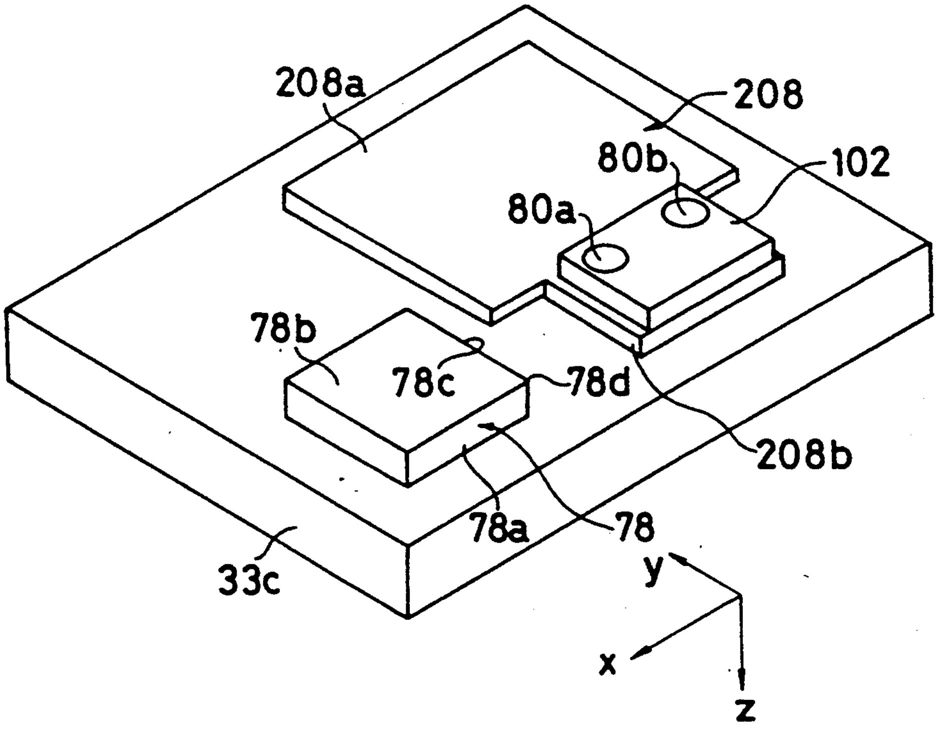
FIG. 9 is a perspective view showing a mounting state of a calibration chart.

As shown in FIG. 9, a calibration chart 78 used in a calibration operation (to be described in detail later) is fixed on the aligning base 33*c* of the above-mentioned second aligning mechanism 33. The calibration chart 78 is precisely arranged at a position to be separated along the x-axis from the heater board 102 on the base member 208 precisely aligned at the predetermined position by the second aligning mechanism 33, and is formed into a rectangular parallelopiped shape.

In particular, a first calibration surface 78*a* is defined from the front end face of the rectangular parallelopiped calibration chart 78. The first calibration surface 78*a* precisely vertically extends along the x-axis direction, and extends within the same vertical plane as the front end face of the heater board 102. A second calibration surface 78*b* is defined from the upper surface of the rectangular parallelopiped calibration chart 78. The second calibration surface 78*b* precisely horizontally extends along the z-axis direction, and extends within the same horizontal plane as the upper surface of the heater board 102. Furthermore, a third calibration surface 78*c* is defined from a side surface on the side of the rectangular parallelopiped calibration chart 78 on which the heater board 102 is arranged. The third calibration surface 78*c* precisely vertically extends along the y-axis direction.

Figure 10:
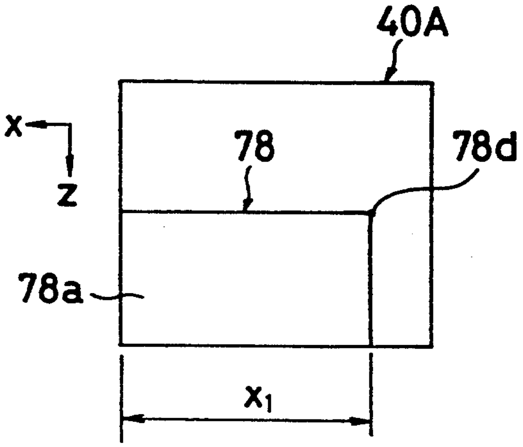
FIG. 10 shows an image of a calibration chart photographed by a first ITV camera in a first position detection mechanism.
Figure 11:
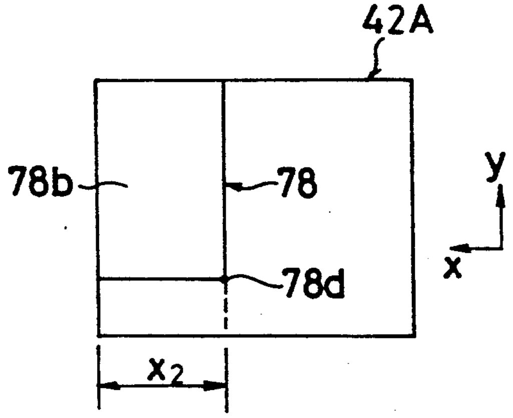
FIG. 11 shows an image of a calibration chart photographed by a second ITV camera in a second position detection mechanism.

A calibration reference point 78*d* is defined by an intersection of the first to third calibration surfaces 78*a* to 78*c*. As a result, when the calibration chart 78 is photographed by the first position detection mechanism 40, only the first calibration surface 78*a* is photographed, as shown in FIG. 10, and the calibration reference point 78*d* is photographed as an intersection of a corner portion located on an upper right portion of a screen 40A. When the calibration chart 78 is photographed by the second position detection mechanism 42, only the second calibration surface 78*b* is photographed, as shown in FIG. 11, and the calibration reference point 78*d* is photographed as an intersection of a corner portion located on a lower right portion of a screen 42A.

In FIG. 9 used for a description of the calibration chart 78, reference numerals 80*a* and 80*b* denote adhesives for temporarily adhering the top plate 104 and the heater board 102. These adhesives 80*a* and 80*b* have ultraviolet-setting characteristics, i.e., are set upon radiation of ultraviolet rays. The adhesives 80*a* and 80*b* are applied in advance to the two end portions of the rear edge of the heater board 102, as shown in FIG. 9.

Assembling Method of Nozzle Head 100 in Assembling Apparatus 10

Figure 12:
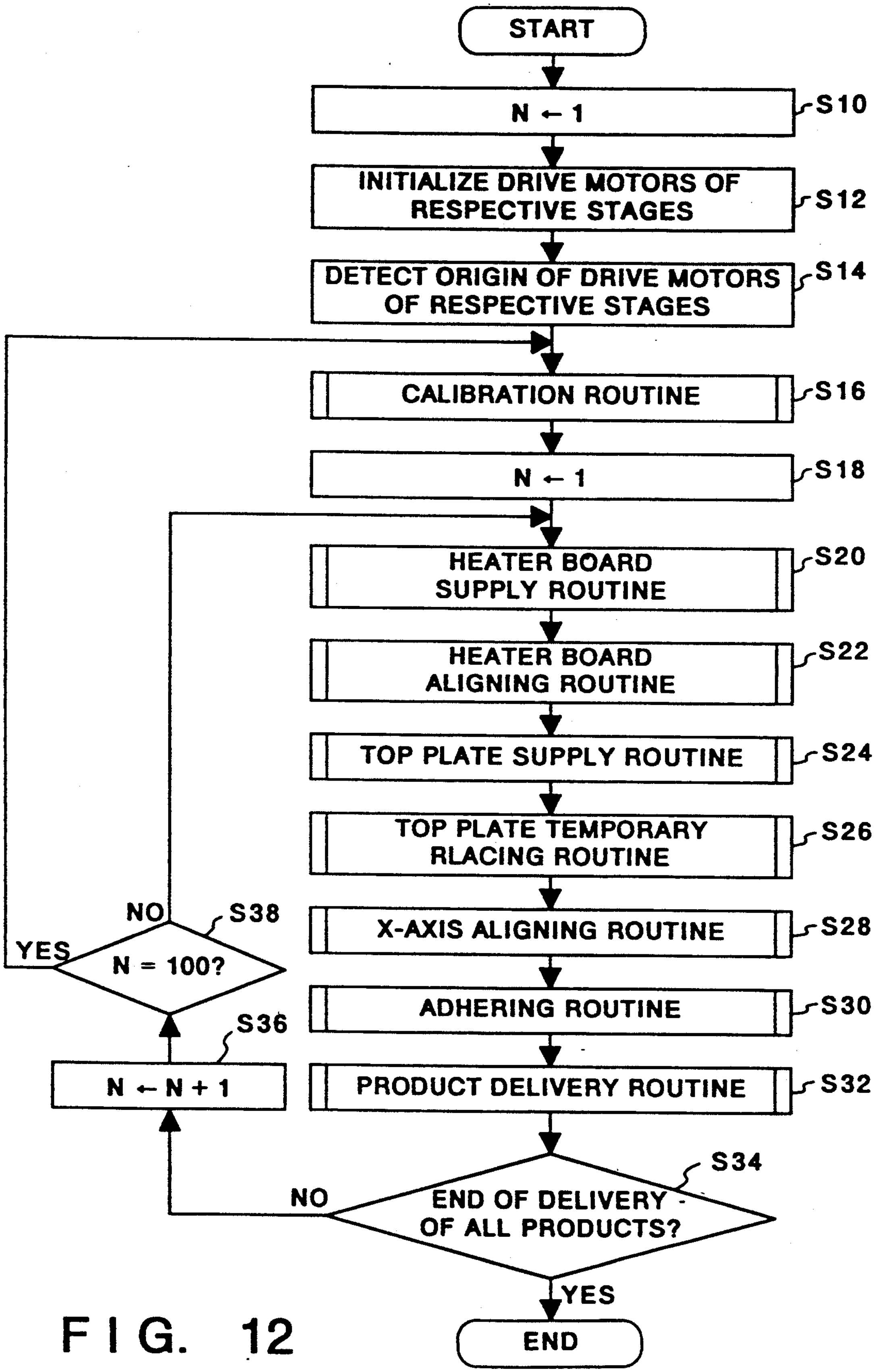
FIG. 12 is a flow chart showing a control sequence of an assembling method in the assembling apparatus according to the present invention.

An assembling method of the nozzle head 100 under the control of the control unit 38 in the assembling apparatus 10 with the above-mentioned arrangement will be described in detail hereinafter with reference to FIG. 12 and subsequent drawings.

Procedures of Assembling Method

The procedures of this assembling method will be briefly described below with reference to the flow chart shown in FIG. 12.

When an assembling operation is instructed, a variable N indicating the number of times of assembling operations is set to be "1" in step S10. In step S12, the drive motors for the respective stages 18, 20, 22, 28, 30, and 32 are initialized. In step S14, origin detection of the drive motors for the respective stages 18, 20, 22, 28, 30, and 32 is executed. Upon execution of steps S12 and S14, the stages 18, 20, 22, 28, 30, and 32 can be precisely moved to arbitrary positions defined with respect to the platen 12.

Thereafter, in step S16, the above-mentioned calibration operation is executed by utilizing the calibration chart 78 so as to calculate in advance a shift amount of the detection positions of the first and second position detection mechanisms 40 and 42 as the calibration amount Δx, thereby calibrating a shift between the detection positions of the first and second position detection mechanisms 40 and 42. Note that the calibration operation is one characteristic feature of the present invention, and will be described in detail later as a subroutine. Upon completion of the calibration operation in step S16, the variable N is set to be "1" again in step S18, and the flow advances to step S20.

In step S20, the base member 208 to which the heater board 102 is attached in advance is supplied from a supply position to a position above the second aligning mechanism 33 of the second position adjustment mechanism 16 via a supply robot (not shown). In step S22, the supplied base member 208 is precisely aligned.

This aligning operation includes an operation for executing aligning operations in three axial directions with respect to the main body 33*a* on the basis of the operation of the second aligning mechanism 33, an operation for precisely measuring a shift amount ($x_h$) of a discharge heater 112*c*, located at the center as a reference position, of discharge heaters 112*a* to 112*e* on the heater board 102 from the assembling operation position α in the x-axis direction as the aligning direction of these discharge heaters 112*a* to 112*e*, and an operation for precisely aligning the upper surface of the heater board 102 to the assembling operation position α in the z-axis direction so as to precisely focus an image, so that the shift amount measurement is executed on the basis of an image photographed by the second ITV camera 42*g*.

Note that the supply operation of the base member 208, i.e., the heater board 102, and the aligning operation will be described in detail later as subroutines.

After the supply and aligning operations of the heater board 102, in step S24, the top plate 104 is supplied from its storage position to the first aligning mechanism 27 of the first position adjustment mechanism 14 via a supply robot (not shown). In step S26, the supplied top plate 104 is temporarily placed on the heater board 102 on the base member 208 which is aligned in advance via the second aligning mechanism 33 in step S22. Note that the supply and temporary placing operations of the top plate 104 will be described in detail later as subroutines.

When the heater board 102 and the top plate 104 to be assembled are supplied, and the top plate 104 is temporarily placed on the aligned heater board 102, the relative positional relationship between the heater board 102 and the top plate 104 in the x-axis direction is precisely defined in step S28, and the heater board 102 and the top plate 104 are adhered to each other in step S30. Upon completion of the adhering operation, an assembly as a product is delivered to a product delivery position via a robot (not shown) in step S32. The x-axis aligning operation and the adhering operation will be described in detail later as subroutines.

In step S34, it is checked if all the assembling operations are ended, and the delivery operations of all the products are ended. If NO in step S34, i.e., if it is determined that the assembling operations are not ended yet, and are being executed, the flow advances to step S36 to increment the variable N by "1". In step S38, it is checked if the variable N has reached a predetermined value. If NO in step S38, i.e., if it is determined that the number of times of assembling operations N is less than the predetermined value, more specifically, if it is determined that the assembling operations are executed less than the predetermined number of times after the latest calibration operation is executed, it is determined that reliability of the calculated calibration amount Δx is maintained, and the flow returns to step S20 so as to execute another assembling operation without executing a new calibration operation. Thus, the assembling control procedures are repetitively executed.

On the other hand, if YES in step S38, i.e., if it is determined that the number of times of assembling operations N has reached the predetermined value after the latest calibration operation is executed, there is a possibility of a change in calibration amount Δx described above. Thus, the flow returns to step S16 to execute the calibration operation again, i.e., to calculate a new calibration amount Δx, and the assembling control procedures are repetitively executed.

More specifically, when the assembling precision is on the order of millimeters, the above-mentioned calibration operation is executed first, and the obtained calibration amount Δx can be used throughout the work time of that day without posing any problem. However, like in this embodiment, when the assembling precision on the order of microns is required, a change in calibration amount Δx upon a change in temperature considerably influences the assembling precision. Meanwhile, the calibration operation is preferably executed for each assembling operation in consideration of the above situation. However, when the calibration operation is executed for each assembling operation, an assembling time is prolonged, assembling efficiency is impaired, and product cost is adversely influenced. In order to maintain both high assembling precision and high assembling efficiency, in this embodiment, the calibration operation is re-executed for every predetermined number of assembling operations.

After the calibration operation is executed in step S16, the variable N is reset to "1" in step S18. Therefore, the number of times of assembling operations in this assembling operation is counted as one, and the number of times of assembling operations is incremented by "1" in the subsequent assembling operations.

If YES in step S34, i.e., if it is determined that all the assembling operations are ended, and the delivery operations of all the products are ended, this assembling control procedure is ended at that time.

The individual control procedures described in the above-mentioned assembling control procedure will be described in detail below as subroutines. In practice, in order to achieve printing precision corresponding to a density as high as 360 dpi, the top plate 104, which integrally comprises the orifice plate 108 in which a large number of discharge orifices 106 are formed at a constant pitch within a length of about 4.5 mm, is assembled on the heater board 102, on which 68 discharge heaters 112 are formed at the same aligning pitch, so that at least 64 discharge orifices 106 and discharge heaters 112 correspond to each other. Therefore, very precise aligning operations, and an operation for delicately applying a joint force are required.

Figure 13:
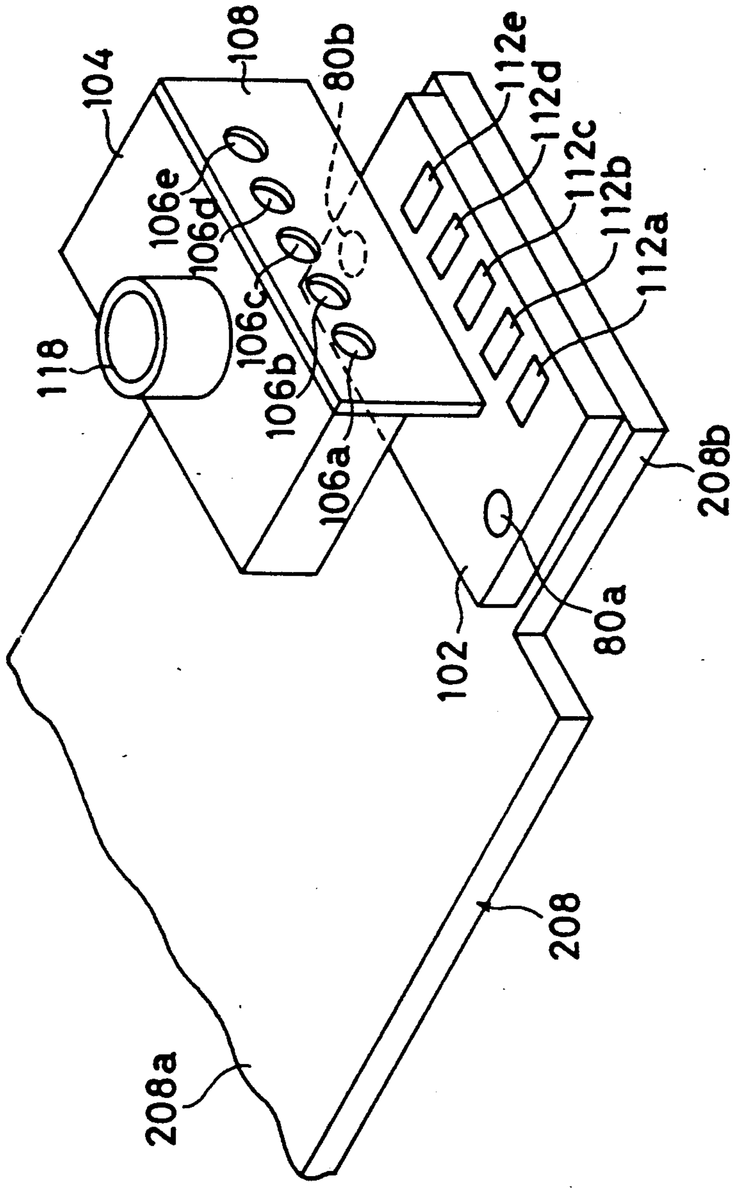
FIG. 13 is a schematic perspective view of a heater board and a top plate constituting a head nozzle so as to clarify a description of the assembling method.

However, if the assembling control procedure is to be described with reference to illustrations of 68 discharge orifices 106 and a large number of discharge heaters 112 as they are, the description becomes indistinct and complicated. Thus, in the following description, for the sake of simplicity, assume that five discharge orifices 106, more specifically, first to fifth discharge orifices 106*a* to 106*e*, are formed on the orifice plate 108, and five discharge heaters 112, more specifically, first to fifth discharge heaters 112*a* to 112*e*, are formed on the heater board 102, as shown in FIG. 13.

Detailed Description of Subroutines

Various subroutines in the assembling control procedure briefly described above with reference to FIG. 12 will be described in detail hereinafter.

Calibration Operation in Step S16

The control procedure of the calibration operation in step S16 described above will be described below with reference to FIGS. 14 and 15, and FIGS. 10 and 11 described above.

Figure 14:
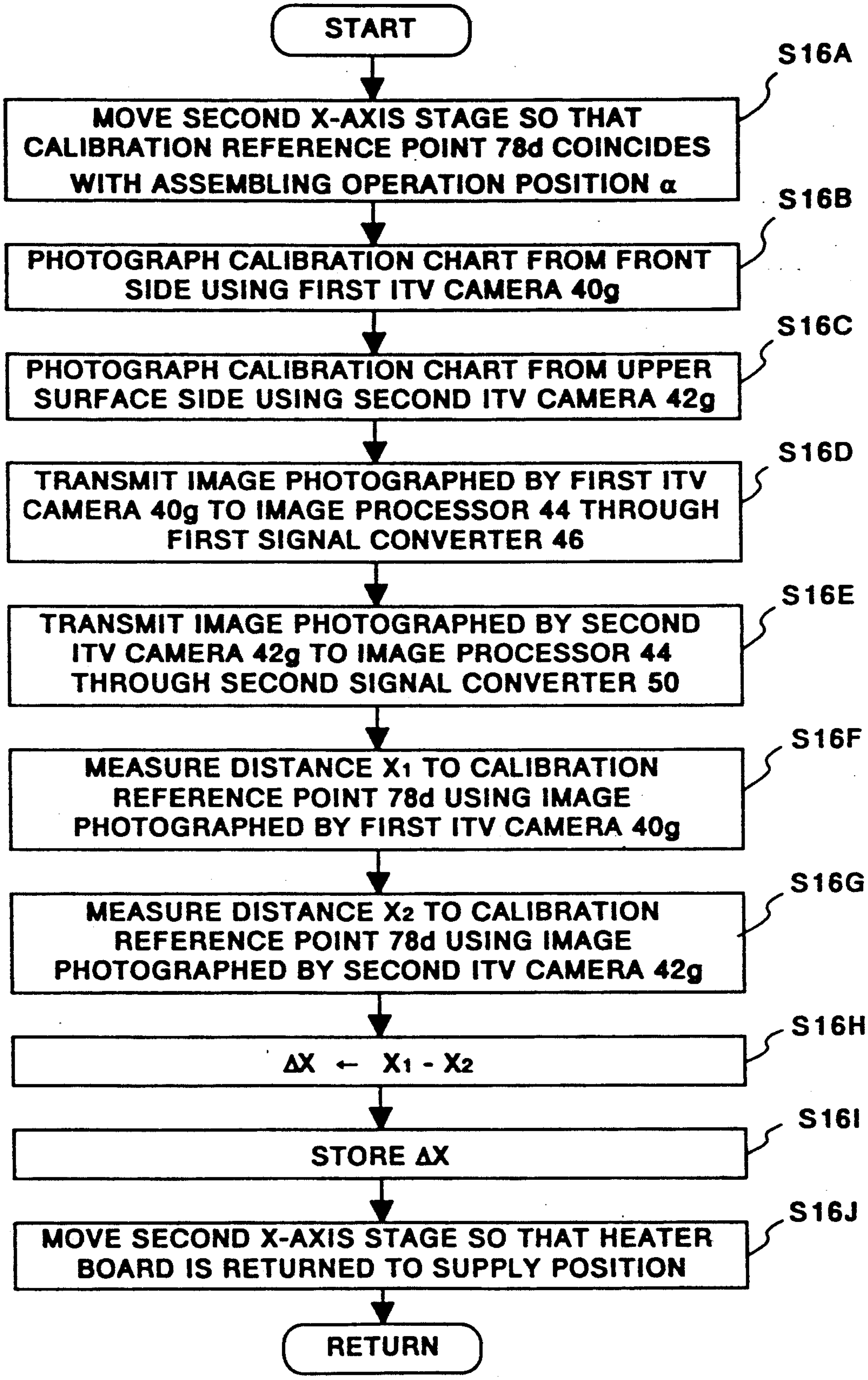
FIG. 14 is a flow chart showing a control sequence of a calibration operation as a subroutine.
Figure 15:
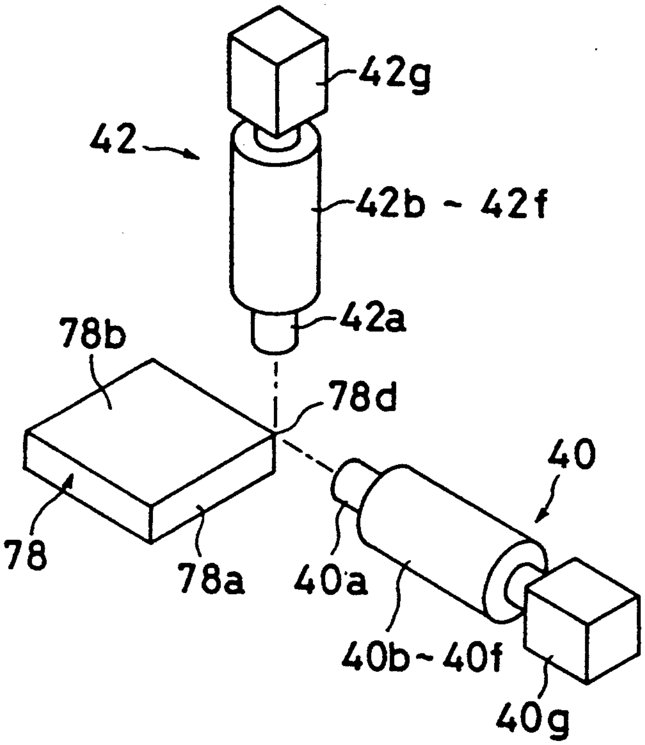
FIG. 15 is a perspective view showing a state wherein a calibration operation is being executed.

As shown in the flow chart of FIG. 14, when the calibration operation is started, in step S16A, the second x-axis stage 28 of the second position adjustment mechanism 16 is driven to move the calibration chart 78 until the calibration reference point 78*d* of the chart 78 coincides with the assembling operation position $\alpha$ defined by the intersection of the optical axes of the objective lenses 40*a* and 42*a* in the first and second position detection mechanisms 40 and 42, as shown in FIG. 15.

In step S16B, the calibration chart 78 is photographed from the front side using the first ITV camera 40*g* of the first position detection mechanism 40. In step S16C, the calibration chart 78 is photographed from the above using the second ITV camera 42*g* of the second position detection mechanism 42. As a result, an image photographed using the first ITV camera 40*g* is displayed, as shown in FIG. 10, and an image photographed using the second ITV camera 42*g* is displayed, as shown in FIG. 11. In step S16D, the image photographed in step S16B is supplied to the image processor 44 via the first signal converter 46, and in step S16E, the image photographed in step S16C is supplied to the image processor 44 via the second signal converter 50.

In step S16F, a distance $x_1$ from the left end of a screen to the calibration reference point 78*d* is electrically measured on the basis of the image photographed via the first ITV camera 40*g*. In step S16G, a distance $x_2$ from the left end of the screen to the calibration reference point 78*d* is electrically measured on the basis of the image photographed via the second ITV camera 42*g*. Thereafter, in step S16H, $x_1-x_2$ is calculated, and the calculation result is defined as the above-mentioned shift amount (calibration amount) $\Delta s$.

In step S16I, the shift amount $\Delta x$ as the calculation result is stored in a memory in the control unit 38, and the data disk 78. In step S16J, the second x-axis stage 28 is driven, so that the aligning base 33*c*, on which the calibration chart 78 is placed, is returned to a supply position where the base member 208 on which the heater board 102 is fixed in advance is supplied. In this manner, a series of calibration operations are ended, and the flow returns to the main routine.

In this calibration operation, the first and second ITV cameras 40*g* and 42*g* photograph the identical calibration reference point 78*d* of the calibration chart 78, and the distances $x_1$ and $x_2$ from the left end of the screen to the identical calibration reference point 78*d* are measured. Therefore, a shift amount between the optical axes of the first and second objective lenses 40*a* and 42*a* can be obtained by $\Delta x$ defined as a difference between these distances $x_1$ and $x_2$.

Heater Board Supply Operation in Step S20

Figure 16:
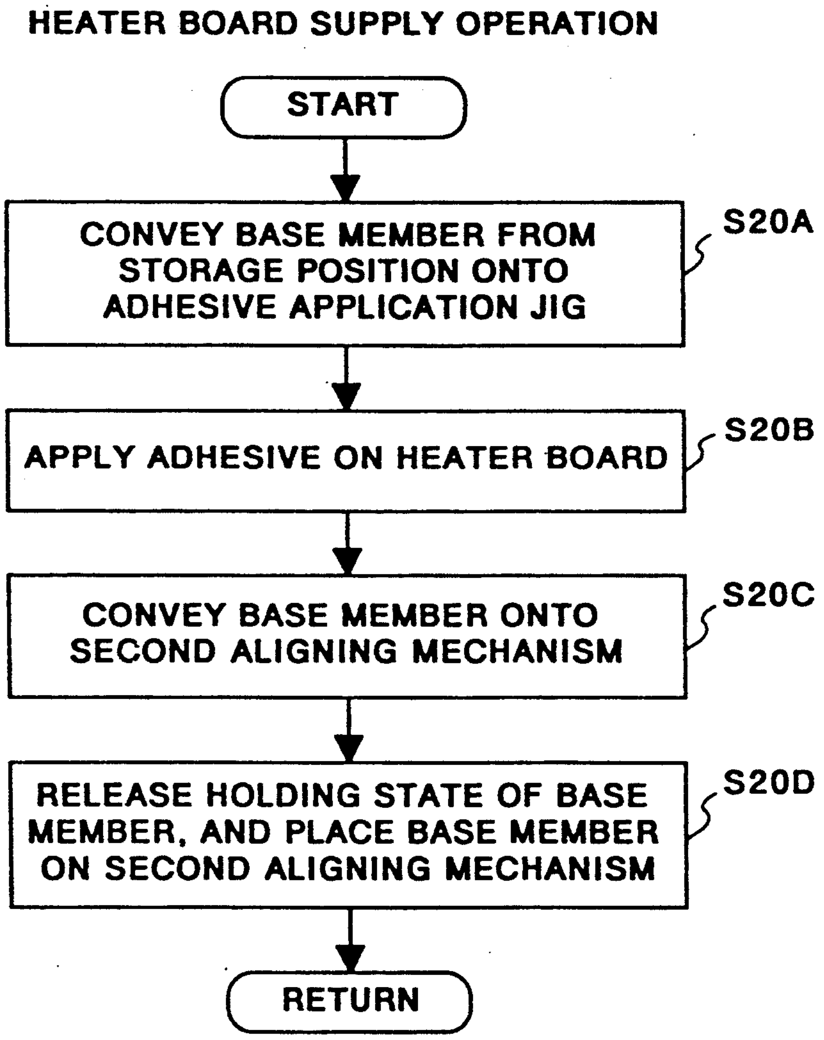
FIG. 16 is a flow chart showing a control sequence of a heater board supply operation as a subroutine.
Figure 17:
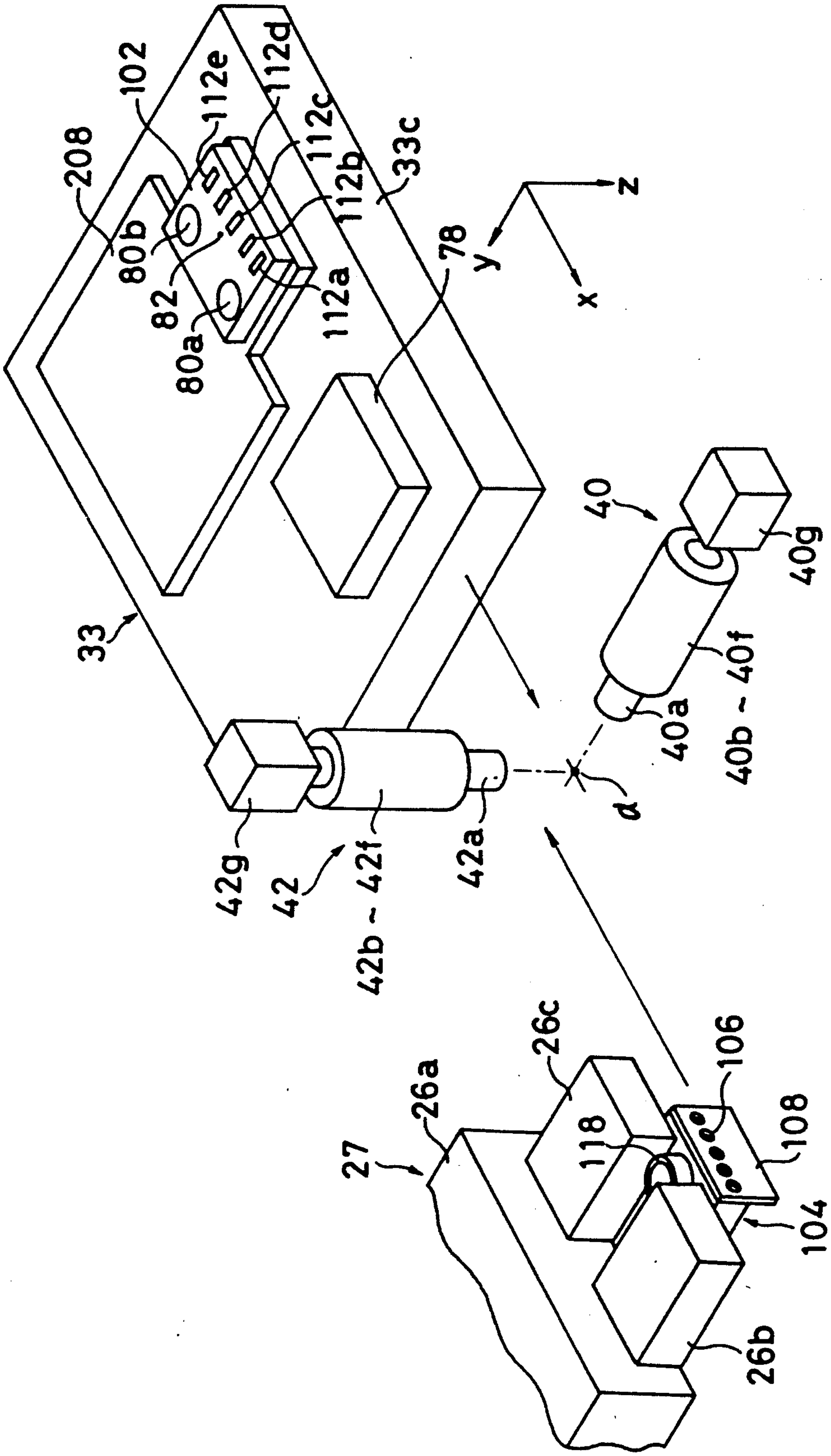
FIG. 17 is a perspective view showing standby positions and assembling operation positions of the first and second aligning mechanisms.
Figure 18A:
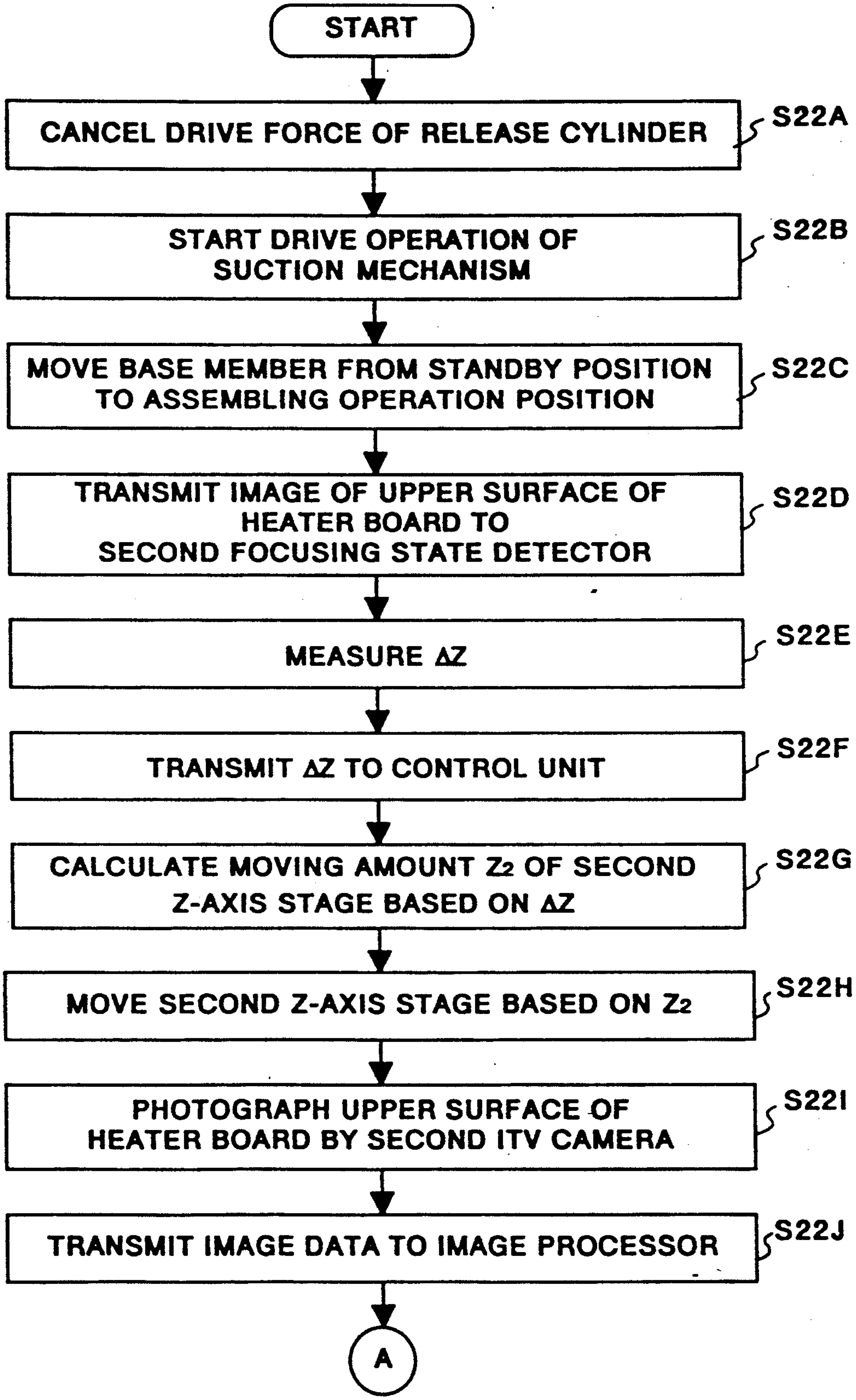
FIGS. 18A and 18B are flow charts showing a control sequence of a heater board aligning operation as a subroutine.
Figure 18B:
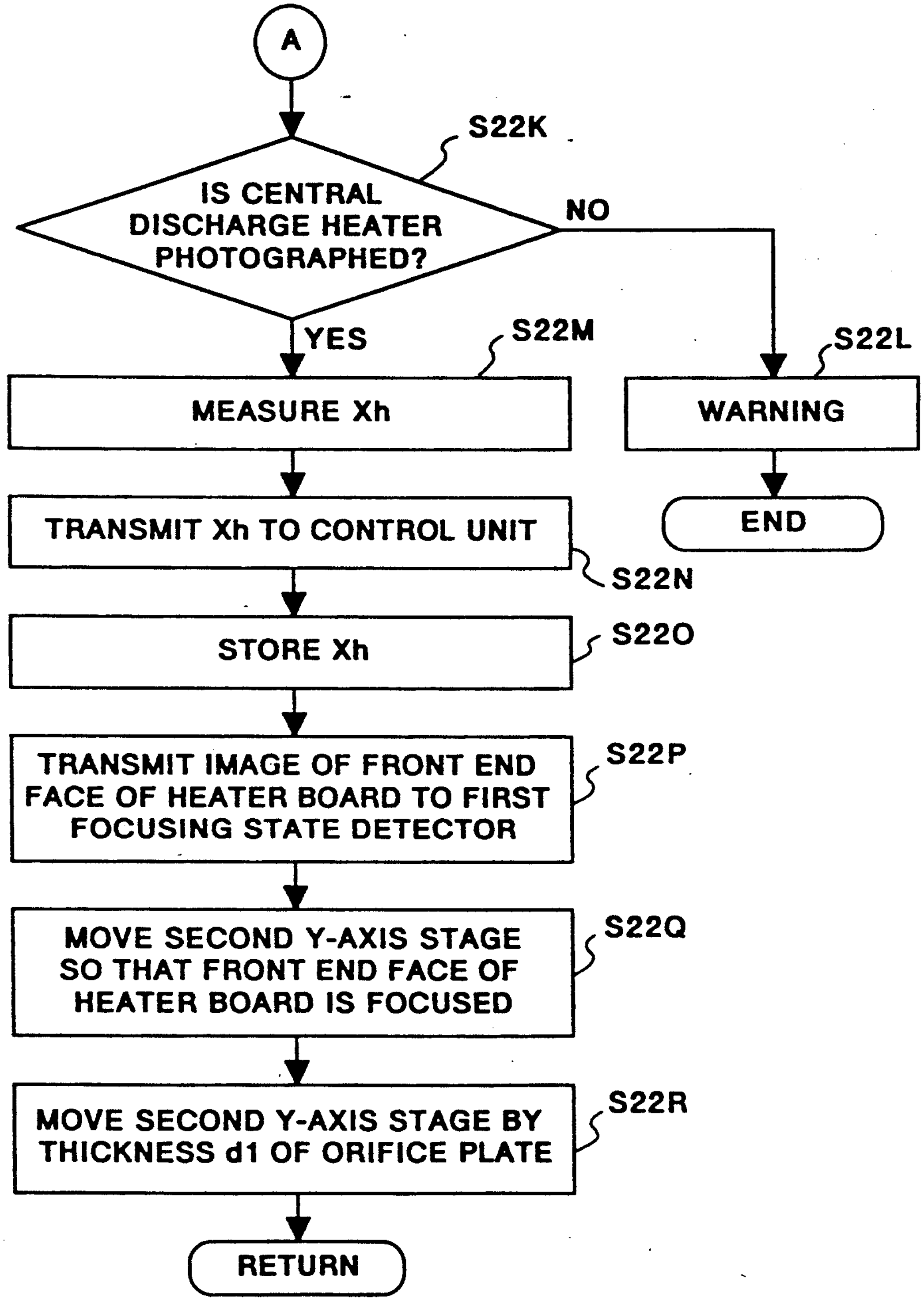

The control procedure of the heater board supply operation in step S20 described above will be described below with reference to the flow chart shown in FIG. 16, and FIG. 17.

As has already been repetitively described above, the heater board 102 is aligned and fixed in advance on the heater board attaching portion 208*b* of the base member 208. Therefore, to supply the heater board 102 means to supply the base member 208 to a position above the second aligning mechanism 33.

When the heater board supply operation is started, in step S20A, the base member 208 to which the heater board 102 is attached in advance is held and picked up from a storage position via a supply robot (not shown), and is then conveyed onto an adhesive apply jig (not shown). In step S20B, the adhesives 80*a* and 80*b* are applied, via an adhesive apply mechanism (not shown), to the predetermined positions of the heater board 102 on the base member 208 placed on the adhesive apply jig, more specifically, to the two end portions of the rear edge of the heater board 102, as shown in FIG. 9.

Note that the adhesives 80*a* and 80*b* comprise ultraviolet-setting adhesives which are set upon radiation of ultraviolet rays, i.e., exhibit adhesion forces, as described above. In other words, at this apply timing, these adhesives 80*a* and 80*b* do not exhibit any adhesion forces, and are merely liquids.

Thereafter, in step S20C, the base member 208 to which the heater board 102, applied with the adhesives 80*a* and 80*b*, is attached is conveyed to a position above the second aligning mechanism 33 located at the standby position. In step S20D, the holding state of the base member 208 by a convey robot is released, and the base member 208 is placed on the second aligning mechanism 33. The standby position of the second aligning mechanism 33 is defined at a position separated from the above-mentioned assembling operation position $\alpha$ by a predetermined distance in the x-axis direction, as shown in FIG. 17.

In this manner, a series of heater board supply operations are ended, and the control returns to the main routine.

Heater Board Aligning Operation in Step S22

The aligning operation of the heater board 102 in step S22 will be described below with reference to the flow charts shown in FIGS. 18A and 18B, FIG. 19, and FIGS. 6 to 8 described above.

In the second aligning mechanism 33 for aligning the heater board 102, in a standby state before the heater board 102 is conveyed, the release mechanism 33D (FIG. 8) is operated, and the release cylinder 33*m* is driven to push out the corresponding piston rod 33*n*. Thus, the release pins 33*r* and 33*s* on the piston rod 33*n* are respectively engaged with the x- and y-axis regulating levers 33*f* and 33*j*, and move these levers to positions separated from the base member 208, i.e., to separated positions.

When the aligning operation is started in a state wherein the second aligning mechanism 33 is set in the standby state, the driving force of the release cylinder 33*m* is released in step S22A. As a result, the corresponding piston rod 33*n* is retracted inwardly by the biasing force of an internal return spring (not shown). Therefore, the release pins 33*r* and 33*s* on this piston rod 33*n* are separated from the x- and y-axis regulating levers 33*f* and 33*j*.

In this manner, since the x-axis regulating lever 33*f* is pivoted counterclockwise by the biasing force of the first torsion spring 33*h*, the base member 208 is pushed from the separated position in the x-axis direction, and abuts against the pair of x-axis aligning projections 33*d* and 33*e* constituting the x-axis aligning unit 33A, so that the x-axis position of the base member 208 is defined. On the other hand, since the y-axis regulating lever 33*j* is pivoted counterclockwise by the biasing force of the second torsion spring 33*l*, the base member 208 is pushed from the separated position in the y-axis direction, and abuts against the y-axis aligning projection 33*i* constituting the y-axis aligning unit 33B, so that the y-axis position of the base member 208 is defined. More specifically, when the driving force of the release cylinder 33*m* is released, the x- and y-axis positions of the base member 208 can be precisely aligned.

After step S22A is executed in this manner, the driving operation of the suction mechanism 33E is started in step S22B. When the suction mechanism 33E is started, a suction source (not shown) is also started, and a suction force from the suction source acts in the suction pad 33*w* via the connection pipe 33*x*. As a result, the base member 208 is drawn downward by suction, and the first and second projections 33*t* and 33*u* constituting the z-axis aligning unit 33C reliably abut against the upper surface of the aligning base 33*c*. In addition, the third projection 33*v* reliably abuts against the lower surface of the base member 208. More specifically, when the suction mechanism 33E is driven, the z-axis position of the base member 208 can be precisely aligned.

In this manner, the three axial positions of the base member 208 can be precisely aligned with the main body 33*a* of the second aligning mechanism 33 upon aligning operation of the second aligning mechanism 33. Upon operation of the suction mechanism 33E, the base member 208 can be reliably held at a position precisely aligned by the second aligning mechanism 33 even when the main body 33*a* is moved.

When step S22B is completed, in step S22C, the second position adjustment mechanism 16 is started to move the base member 208 aligned and held by the second aligning mechanism 33 from the standby position to the assembling operation position $\alpha$. In step S22D, the image of the upper surface of the heater board 102 on the base member 208 brought to the assembling operation position $\alpha$ is transmitted to the second focusing state detector 52 via the focusing state judgment second optical system 42*e*.

In step S22E, the second focusing state detector 52 measures a z-axis defocus amount $\Delta z$ from an in-focus position, i.e., the z-axis defocus amount $\Delta z$ at the assembling operation position $\alpha$ since the in-focus position corresponds to the designed z-axis setting position. In step S22F, the measured defocus amount $\Delta z$ is supplied to the control unit 38. Thereafter, in step S22G, the control unit 38 calculates a moving amount $Z_2$ of the second z-axis stage 30 on the basis of the defocus amount $\Delta z$. In step S22H, the second z-axis stage 30 is moved based on the calculated moving amount $Z_2$, thereby precisely defining the z-axis position of the upper surface of the heater board 102 at the assembling operation position $\alpha$.

Figure 19:
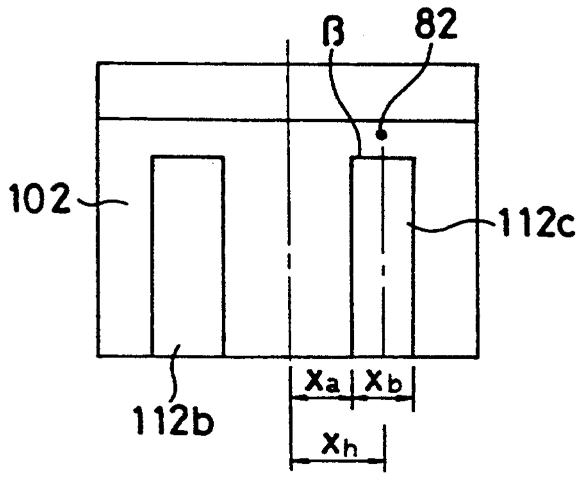
FIG. 19 shows an image of a heater board photographed by the second ITV camera.

In step S22I, the upper surface of the heater board 102 is photographed by the second ITV camera 42*g* of the second position detection mechanism 42. In step S22J, the photographed image data is supplied to the image processor 44 via the second signal converter 50. FIG. 19 shows the image of the heater board photographed by the second ITV camera 42*g*. The image obtained by the second ITV camera 42*g* is a precisely focused, sharp image since the z-axis position of the upper surface of the heater board 102 at the assembling operation position $\alpha$ is precisely defined in steps S22D to S22H.

As shown in FIG. 19, the central discharge heater 112*c* should be displayed in the image when the discharge heaters 112*a* to 112*e* are formed on the heater board 102 with predetermined formation precision, and the second aligning mechanism 33 executes the predetermined aligning operations. The subsequent assembling operations are enabled as long as the central discharge heater 112*c* is displayed.

For this reason, it is checked in step S22K if the central discharge heater 112*c* is displayed. If NO in step S22K, since the subsequent assembling operations are disabled, an alarm is generated in step S22L, and the control procedure is ended. On the other hand, if it is determined in step S22K that the central discharge heater 112*c* is displayed, the flow advances to step S22M, and an x-axis shift amount $x_h$ of the discharge heater 112*c* from the assembling operation position $\alpha$ is measured.

Upon measurement of the x-axis shift amount $x_h$, when the central discharge heater 112*c* is offset from the center line to the right side of the screen, a sign (+) is added, and when it is offset to the left side, a sign (−) is added.

In this embodiment, as a means for identifying the central discharge heater 112*c* from the five discharge heaters 112*a* to 112*e*, as shown in FIG. 19, an identification mark 82 is formed at a position adjacent to the discharge heater 112*c*. More specifically, in step S22K described above, when this identification mark 82 is recognized within the image, it is determined that the central discharge heater 112*c* is displayed. However, when the identification mark 82 cannot be recognized, it is determined that the discharge heater 112*c* is not displayed.

In this embodiment, the identification mark 82 is simultaneously formed by, e.g., masking using the same material and the same formation method as the heaters 112 when the heaters 112 for heating an ink are formed on a substrate in the manufacture of the heater board 102 beforehand. As a result, as compared to, e.g., a case wherein the identification mark 82 is printed with an ink on the surface of the manufactured heater board 102, the identification mark 82 can be prevented from being formed at a wrong position, and recognition of the central discharge heater 112*c* can be precisely executed.

Note that the above-mentioned x-axis shift amount $x_h$ is defined as a distance from the central position of the image to the central position of the central discharge heater 112*c*, and the central position of the image is set in advance to coincide with the assembling operation position $\alpha$.

After the x-axis shift amount $x_h$ is measured, the shift amount $x_h$ is transmitted to the control unit 38 in step S22N. In step S220, the shift amount $x_h$ is stored in the memory in the control unit 38.

Thereafter, in step S22P, the image of the front end face of the heater board 102 on the base member 208 brought to the assembling operation position $\alpha$ is transmitted to the first focusing state detector 48 via the focusing state judgment first optical system 40*e* of the first position detection mechanism 40. In step S22Q, the second y-axis stage 32 is driven so as to move the heater board 102, so that an in-focus state, i.e., focusing, is attained by the first focusing state detector 48. When the focusing operation is completed in step S22Q, the second y-axis stage 32 is further moved by a thickness $t_1$ of the above-mentioned orifice plate 108 so as to be separated from the in-focus position in step S22R.

In this manner, since the y-axis position of the front end face of the heater board 102 is offset by the thickness $t_1$ of the orifice plate 108, the first position detection mechanism 40 can precisely focus the image of the surface of the orifice plate 108 without executing any focus detection operation when the top plate 104 is attached onto the heater board 102, and the orifice plate 108 fixed in advance to the front end face of the top plate 104 is in tight contact with the front end face of the heater board 102.

In this manner, a series of aligning operations of the heater board 102 are ended, and the control returns to the main routine.

Supply Operation of Top Plate 104 in Step S24

Figure 20:
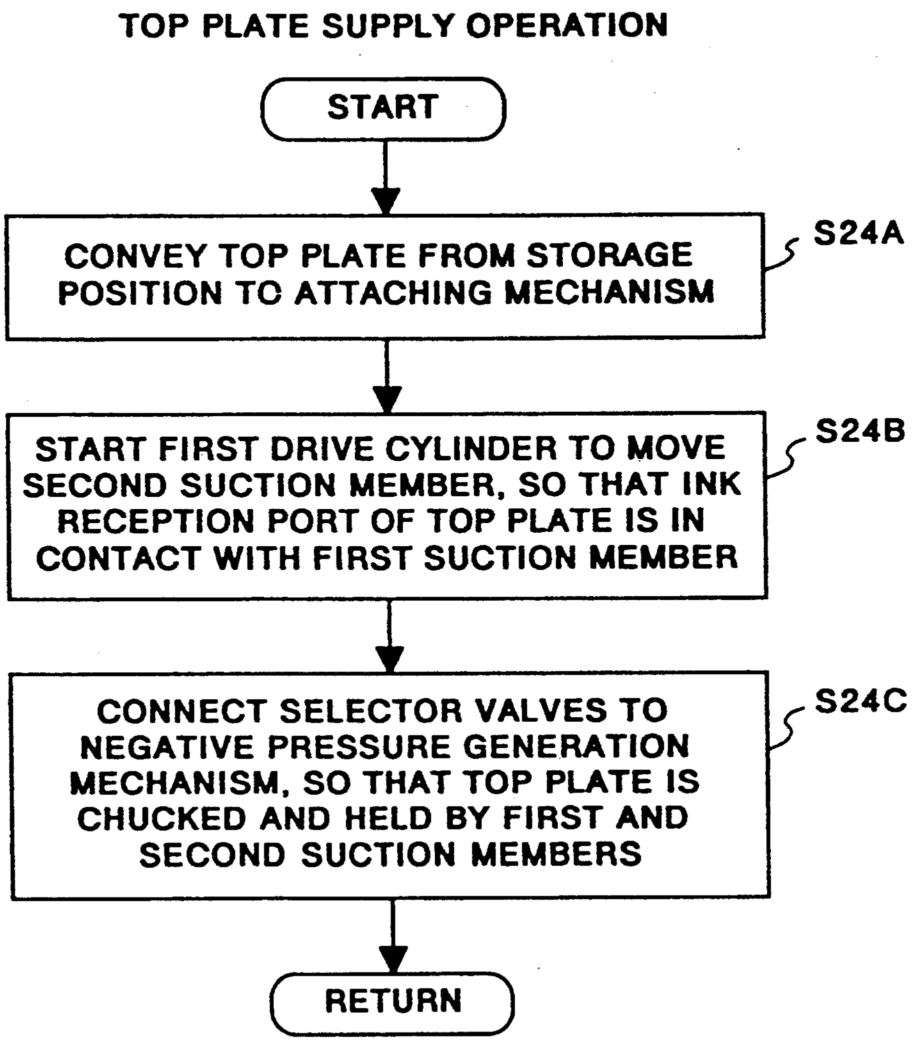
FIG. 20 is a flow chart showing a control sequence of a top plate supply operation as a subroutine.

The supply operation of the top plate 104 in step S24 will be described below with reference to the flow chart shown in FIG. 20, and FIG. 17 described above.

When the supply operation of the top plate 104 is started, the top plate 104 is conveyed from its storage position to the attaching mechanism 26 at the standby position via a supply robot (not shown) in step S24A. More specifically, the top plate 104 is conveyed so that the cylindrical ink reception port 118 of the top plate 104 is fitted from below into a gap defined between the pair of suction members 26*b* and 26*c* constituting the attaching mechanism 26. In step S24B, the first drive cylinder of the first aligning mechanism 27 is driven to drive the movable second suction member 26*c* toward the stationary first suction member 26*b*, so that the ink reception port 118 is clamped between the first and second suction members 26*b* and 26*c* with a weak force, as shown in FIG. 17. In this manner, the upright contact surface 118*b* of the ink reception port 118 is in light contact with the inner surface defined as the reference surface of the stationary first suction member 26*b*. As a result, the x-axis position of the ink reception port 118, i.e., the top plate 104 with respect to the attaching mechanism 26 can be precisely defined.

Since a weak force for clamping the ink reception port 118 is set, deformation of the ink reception port 118 by this clamping force is negligible, and in this clamping state, although the ink reception port 118 can be clamped, the top plate 104 cannot be held.

Thereafter, in step S24C, the top plate main body 116 of the top plate 104 whose x-axis position is aligned is chucked and held on the lower surfaces of the first and second suction members 26*b* and 26*c* via the suction holes 26*d* and 26*e* respectively formed in the lower surfaces of the first and second suction members 26*b* and 26*c*.

In this manner, a series of supply operations of the top plate 104 are ended, and the control returns to the main routine.

Temporary Placing Operation of Top Plate 104 in Step S26

Figure 21:
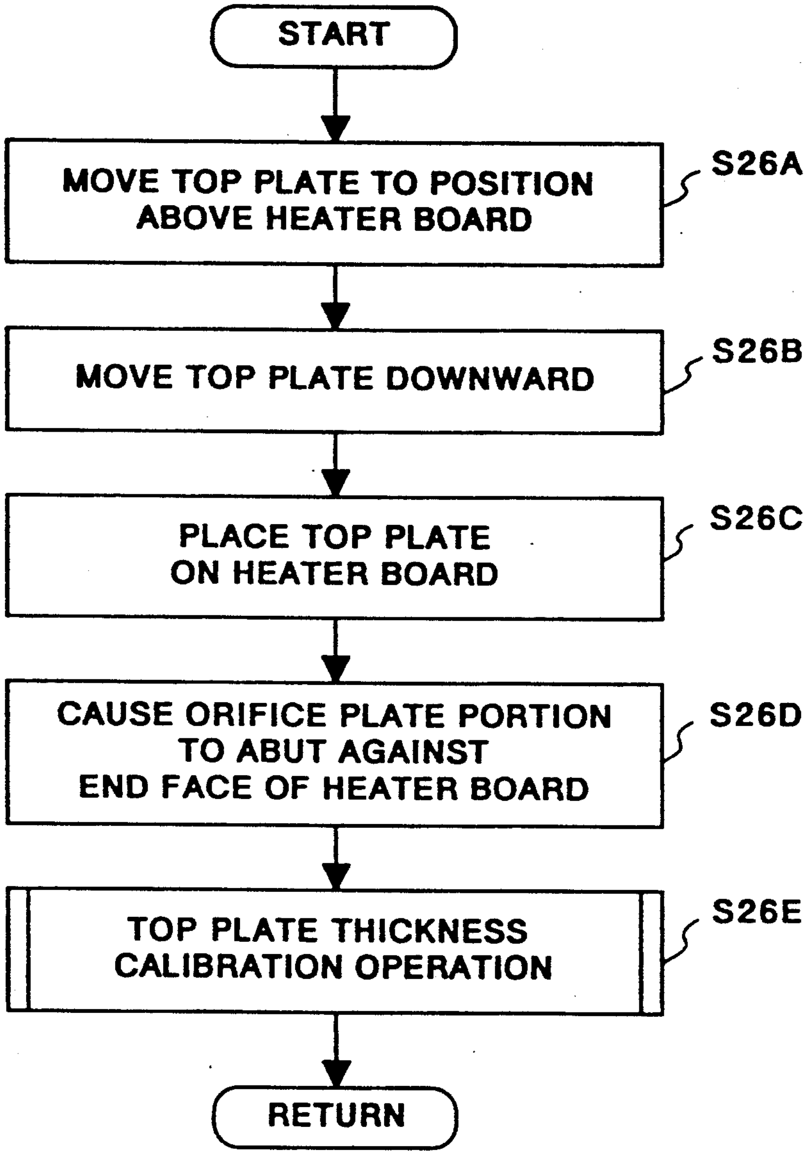
FIG. 21 is a flow chart showing a control sequence of a top plate temporary placing operation as a subroutine.
Figure 22:
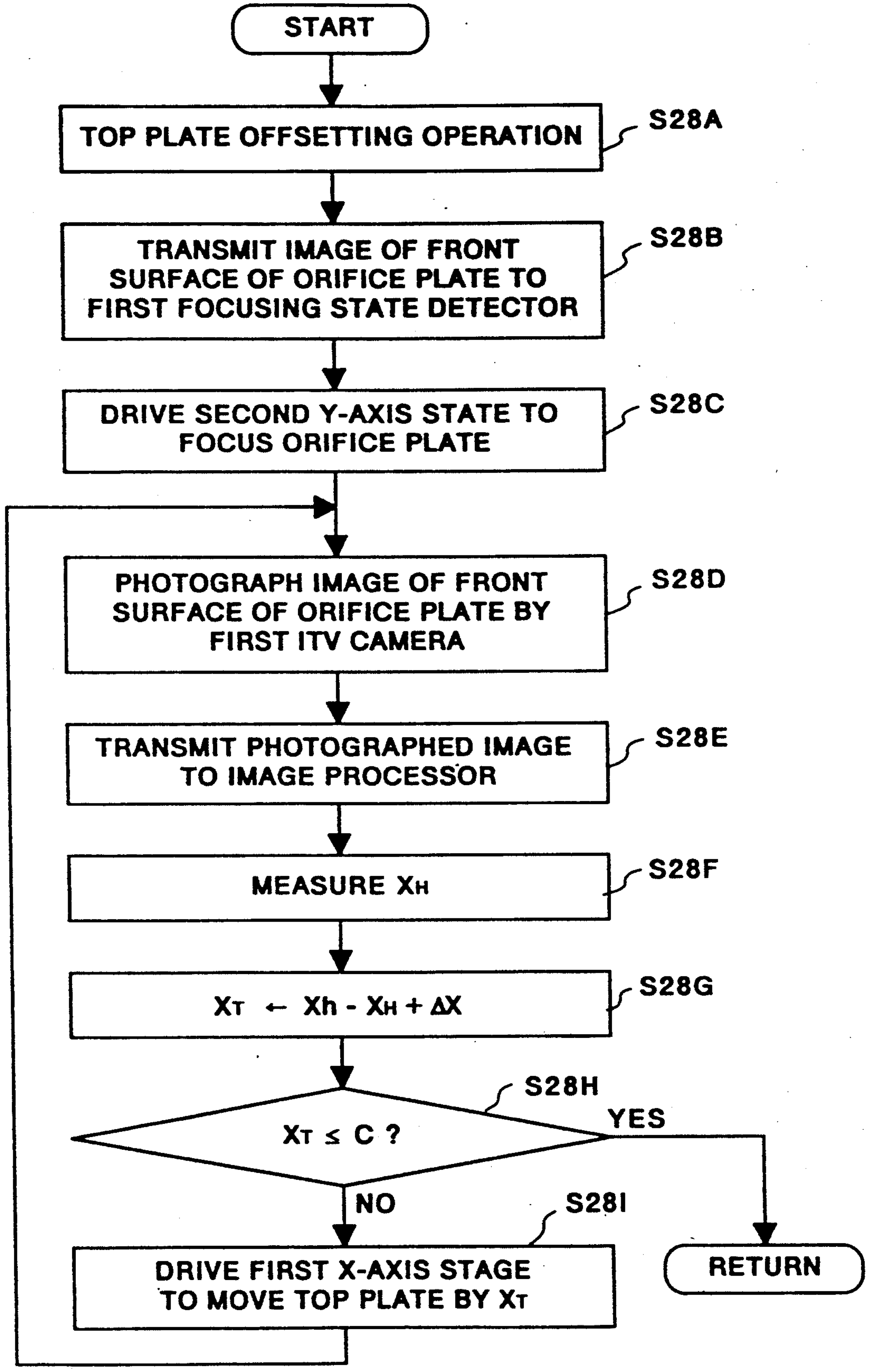
FIG. 22 is a flow chart showing a control sequence of an operation for aligning a top plate with a heater board in the x-axis direction.

The temporary placing operation of the top plate 104 on the heater board 102 in step S26 will be described with reference to the flow chart shown in FIG. 21.

As has already been described above, since both the top plate 104 and the heater board 102 are precision components, they may be damaged upon application of an excessive force. For this reason, prior to the x-axis aligning operation in step S28, the operation for temporarily placing the top plate 104 on the heater board 102 is executed.

When the temporary placing operation is started, in step S26A, the first position adjustment mechanism 14 is driven to move the top plate 104 to a position immediately above the heater board 102 while keeping a sufficient gap between the top plate 104 and the heater board 102. Thereafter, in step S26B, the top plate 104 is moved downward in the z-axis direction to eliminate the gap between the top plate 104 and the heater board 102. In step S26C, the top plate 104 is dropped onto the heater board 102.

In this state, the top plate 104 is placed on the heater board 102 while its placing position is not precisely defined. For this reason, in step S26D, the engaging pieces 26*m* and 26*n* of the first aligning mechanism 27 are moved, so that the orifice plate 108 abuts against the front end face of the heater board 102. Furthermore, in step S26E, as a preparation for the x-axis aligning operation, a thickness calibration operation of the top plate 104 is performed, thereby setting the optimal positional relationship between the top plate 104 and the suction members 26*b* and 26*c* in the first aligning mechanism 27.

In this manner, a series of temporary placing operations of the top plate 104 onto the heater board 102 are ended, and the control returns to the main routine.

X-axis Aligning Operation of Top Plate 104 to Heater Board 102 in Step S28

The x-axis aligning operation of the top plate 104 on the heater board 102 in step S28 will be described below with reference to the flow chart shown in FIG. 22, and FIGS. 23 to 28.

In the temporary placing operation of the top plate 104 described above, the attaching mechanism 26 is moved to the designed attaching position by driving the first position adjustment mechanism 14, and thereafter, the top plate 104 is dropped from the attaching mechanism 26 onto the heater board 102. The top plate 104 is then aligned with the above-mentioned designed attaching position, thus executing the temporary placing operation.

As has already been described above, since the aligning pitch of the discharge orifices 106 formed in the orifice plate 108 of the top plate 104, and that of the discharge heaters 112 formed on the heater board 102 are on the order of microns, not only designed absolute alignment but also alignment of the discharge orifices 106 relative to the discharge heaters 112 must be executed, so that the corresponding discharge heaters 112 and discharge orifices 106 are assembled within the predetermined positional precision. Since the aligning direction of these discharge orifices 106 and the discharge heaters 112 is set in the x-axis direction, the final alignment of the top plate 104 to the heater board 102 is performed via image processing in only the x-axis direction.

Figure 23:
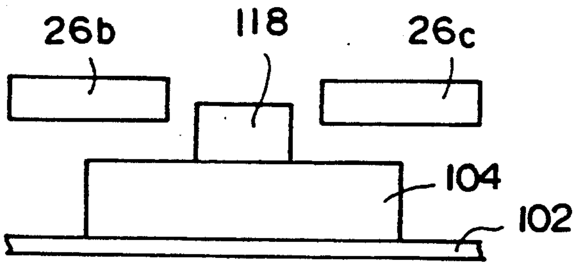
FIGS. 23 to 26 are schematic views showing top plate offsetting operations in turn.
Figure 24:
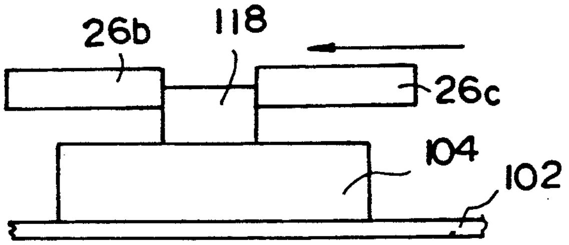
Figure 25:
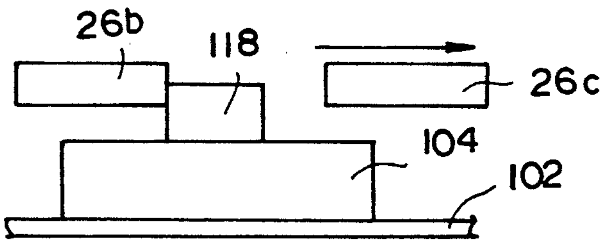
Figure 26:
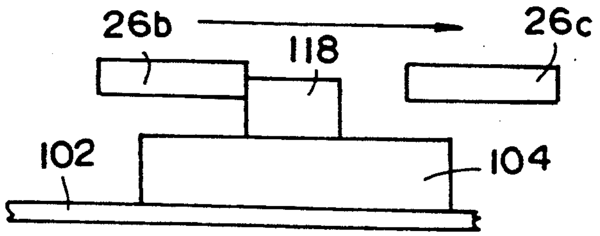

When the x-axis aligning operation is started, in step S28A, an offsetting operation of the top plate 104 is executed. More specifically, in the offsetting operation, as shown in FIG. 23, the movable suction member 26c is moved toward the stationary suction member 26b from a state wherein the cylindrical ink reception port 118 of the top plate 104 is located between the two suction members 26b and 26c, until the ink reception port 118 abuts against the stationary suction member 26b. As a result, the upright contact surface 118b formed on the outer circumferential surface 118a of the ink reception port 118 is brought into contact with the reference surface defined by the inner surface of the first suction member 26b, and the relative position between the top plate 104 and the first suction member 26b is precisely defined. As shown in FIG. 25, the movable suction member 26c is returned to the original position, and as shown in FIG. 26, the two suction members 26b and 26c are integrally moved, i.e., the attaching mechanism 26 is entirely moved, thereby moving the top plate 104 to a predetermined position. In this manner, the offsetting operation of the top plate 104 is completed.

Figure 27:
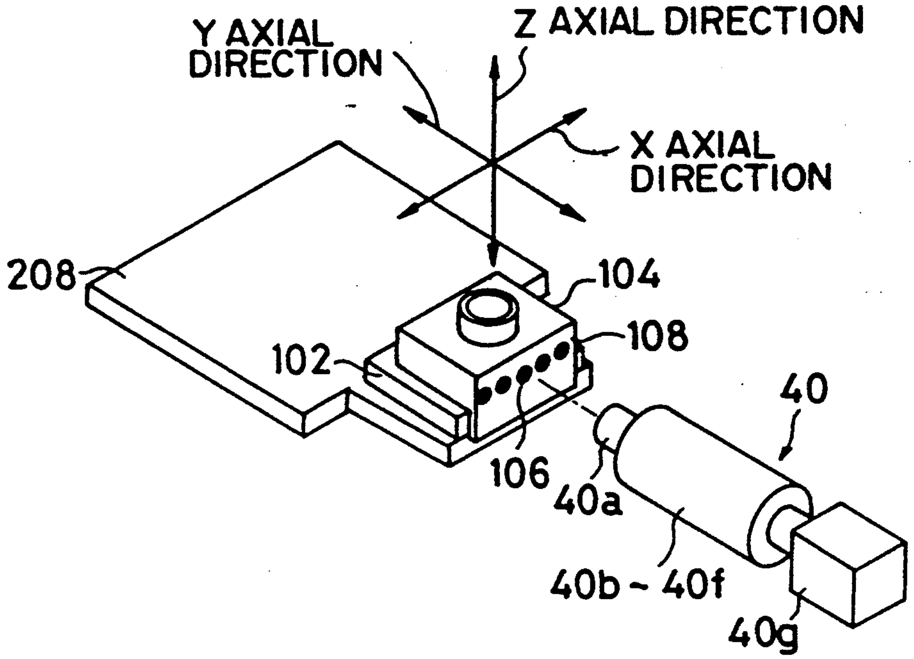
FIG. 27 is a perspective view showing a photographed state of an orifice plate in the operation for aligning the top plate with the heater board in the x-axis direction.

Upon completion of the offsetting operation of the top plate 104, in step S28B, the image of the front surface of the orifice plate 108 attached to the front portion of the top plate 104 temporarily placed on the heater board 102 is transmitted to the first focusing state detector 48 via the focusing state judgment first optical system 40e of the first position detection mechanism 40, as shown in FIG. 27. In step S28C, the second y-axis stage 32 is driven so as to integrally move the heater board 102 and the top plate 104 in the y-axis direction, so that an in-focus state, i.e., focusing, is attained by the first focusing state detector 48.

This focusing operation can be completed within a very short period of time since the first ITV camera 40g has already been focused with respect to the front surface of the orifice plate 108 in steps S22P to S22R in the aligning operation of the heater board 102 described above. In addition, the focusing operation can be reliably prevented from being disabled when the front surface of the orifice plate 108 falls outside an in-focus range.

Figure 28:
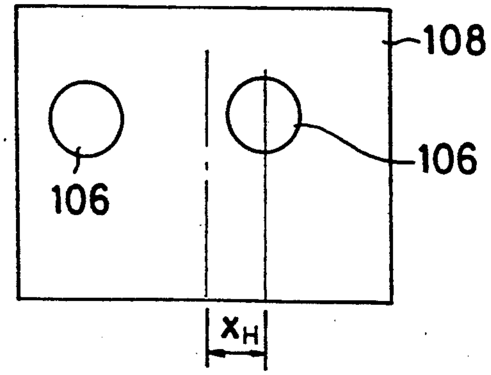
FIG. 28 shows images of discharge orifices of the orifice plate photographed by the first ITV camera.

When the focusing operation is completed in step S28C, the front surface of the orifice plate 108 fixed to the front surface side of the top plate 104 temporarily placed on the heater board 102 is photographed by the first ITV camera 40g of the first position detection mechanism 40 in step S28D. The image of the orifice plate 108 photographed by the first ITV camera 40g is a precisely focused, sharp image, as shown in FIG. 28, since the focusing operation is completed.

Thereafter, in step S28E, the image photographed in step S28C is transmitted to the image processor 44 via the first signal converter 46. In step S28F, the distance $x_H$ from the center of the screen to the central position of the discharge orifice 106, which is determined to be most adjacent to the central discharge heater 112c described above, is electrically measured on the basis of the image photographed through the first ITV camera 40g. In the same manner as in the aligning operation of the heater board 102 in step S22 described above, the central line of the screen corresponds to the assembling operation position $\alpha$, and this distance $x_H$ represents an x-axis shift amount from the assembling operation position $\alpha$ to the discharge orifice 106 to be combined with the central discharge heater 112c.

Upon completion of the measurement of the shift amount $x_H$ from the central line of the discharge orifice 106 corresponding to the above-mentioned central discharge heater 112c, in step S28G, a moving amount $x_T$ necessary for moving the top plate 104 comprising the orifice plate 108 formed with this discharge orifices 106 in the x-axis direction is calculated using the following equation, so that the central discharge heater 112c precisely vertically coincides with the corresponding discharge orifice 106:

$$x_T = x_h - x_H + \Delta x$$

In step S28H, it is checked if the calculated moving amount $x_T$ is smaller than an x-axis alignment rated adjustment range C prestored in a data disk. If YES in step S28H, i.e., if it is determined that the moving amount $x_T$ is smaller than the rated adjustment range C, the control unit 38 determines that the x-axis positions of the discharge heaters 112 of the heater board 102, and the discharge orifices 106 formed in the orifice plate 108 of the top plate 104 coincide with each other, and ends the control procedure of the x-axis aligning operation. The control then returns to the main routine.

On the other hand, if NO in step S28H, i.e., if it is determined that the moving amount $x_T$ is larger than the rated adjustment range C, the first x-axis stage 18 is driven to move the top plate 104 by a distance corresponding to the moving amount $x_T$ in step S28I, and the flow then returns to step S28D.

When the top plate 104 is aligned with the heater board 102 in this manner, the central line of the discharge heater 112c located at the center of the heater board 102, and that of the discharge orifice 106, most adjacent to the discharge heater 112c, of the orifice plate 108 of the top plate 104 can coincide with each other in the x-axis direction.

In this manner, a series of x-axis aligning operations between the top plate 104 and the heater board 102 are ended, and the control returns to the main routine.

Adhering Operation of Top Plate 104 to Heater Board 102 in Step S30

Figure 29:
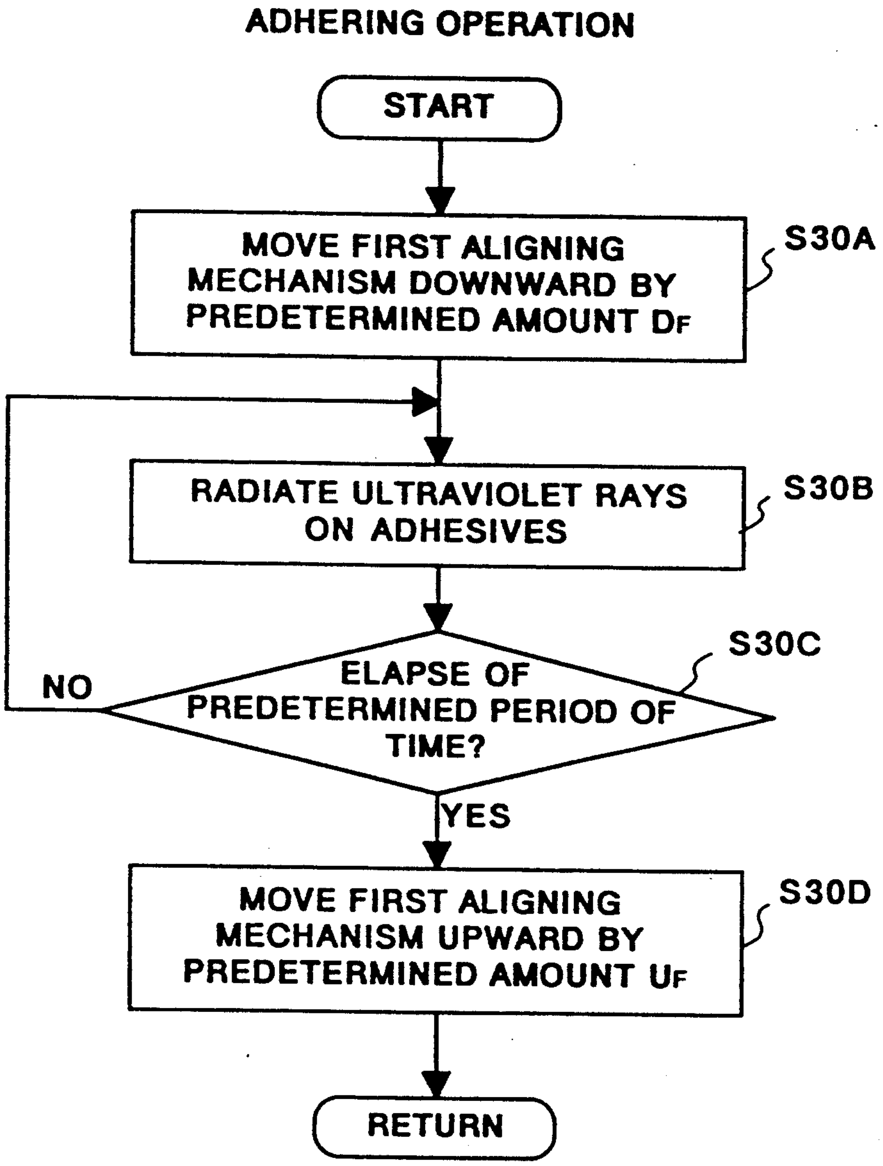
FIG. 29 is a flow chart showing an adhering operation of the top plate and the heater board.

The adhering operation of the top plate 104 onto the heater board 102 in step S30 will be described below with reference to the flow chart shown in FIG. 29, and FIG. 23.

Figure 30:
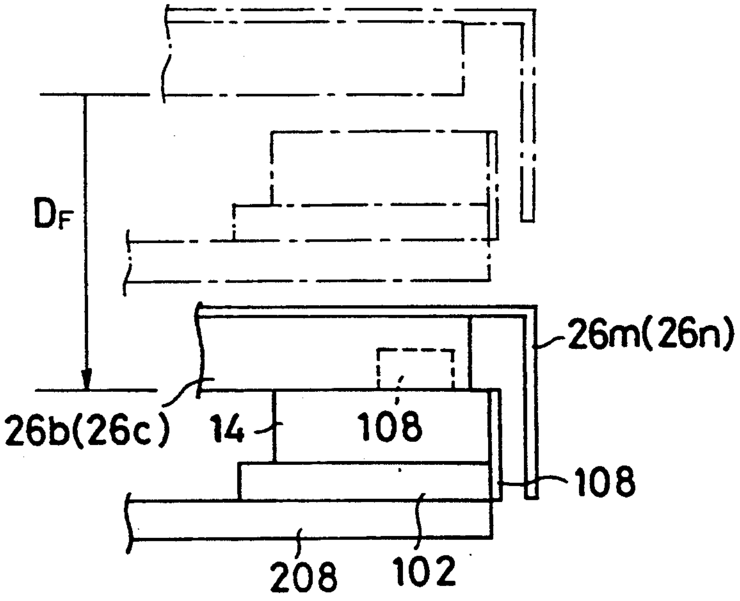
FIG. 30 is a view for explaining a joint force generation state.

Upon completion of the x-axis aligning operation of the top plate 104 to the heater board 102 in step S28, in step S30A, the first z-axis stage 20 in the first position adjustment mechanism 14 is started, thereby moving the entire first aligning mechanism 27, i.e., the first and second suction member 26*b* and 26*c* downward by a predetermined amount $D_F$ in the z-axis direction. The first and second suction members 26*b* and 26*c* abut against the top plate 104 during the downward movement, as shown in FIG. 30. In this case, the top plate 104 contacting the suction members is pushed downward against the biasing force of the coil spring 34*c* in the joint force generation mechanism 34 while integrally accompanying the heater board 102 therebelow.

The predetermined downward movement amount $D_F$ of the first z-axis stage 20 is set to be a value enough to apply a biasing force generated in the coil spring 34*c* when the top plate 104 and the heater board 102 are pushed downward upon this downward movement to a portion between the top plate 104 and the heater board 102 as a predetermined joint force..

When the predetermined joint force is generated between the heater board 102 and the top plate 104 in this manner, the ultraviolet light source 58 emits ultraviolet rays in step S30B. The ultraviolet rays are guided to the pair of ultraviolet transmission suction members 26*b* and 26*c* via the pair of light guides 56, and are radiated on the adhesives 80*a* and 80*b* via these suction members. As a result, since these adhesives 80*a* and 80*b* have ultraviolet-setting characteristics, they begin to be set, i.e., exhibit adhering forces. More specifically, the heater board 102 and the top plate 104 are adhered to each other via the adhesives 80*a* and 80*b* while they are in tight contact with each other by the predetermined joint force.

As described above, when the joint force in the joint force generation mechanism 34 is to be changed, the washer 34*b* is rotated, and is moved along the axial direction of the guide shaft 34*a*, thereby changing a deformation amount of the coil spring 34*c*.

Thereafter, in step S30C, the control waits for an elapse of a predetermined period of time, i.e., waits until the adhesives 80*a* and 80*b* are completely set. In step S30D, the first z-axis stage 20 in the first position adjustment mechanism 14 is started again, thereby moving the entire first aligning mechanism 27, i.e., the first and second suction members 26*b* and 26*c* upward by the same upward movement amount $U_P$ as the above-mentioned downward movement amount $D_F$ in the z-axis direction. As a result, the first and second suction members 26*b* and 26*c* are moved upward until they are separated upward from the top plate 104, and stand by at that position.

In this manner, the control procedure of a series of adhering operations is completed, and the control returns to the main routine.

Product Delivery Operation in Step S32

Figure 31:
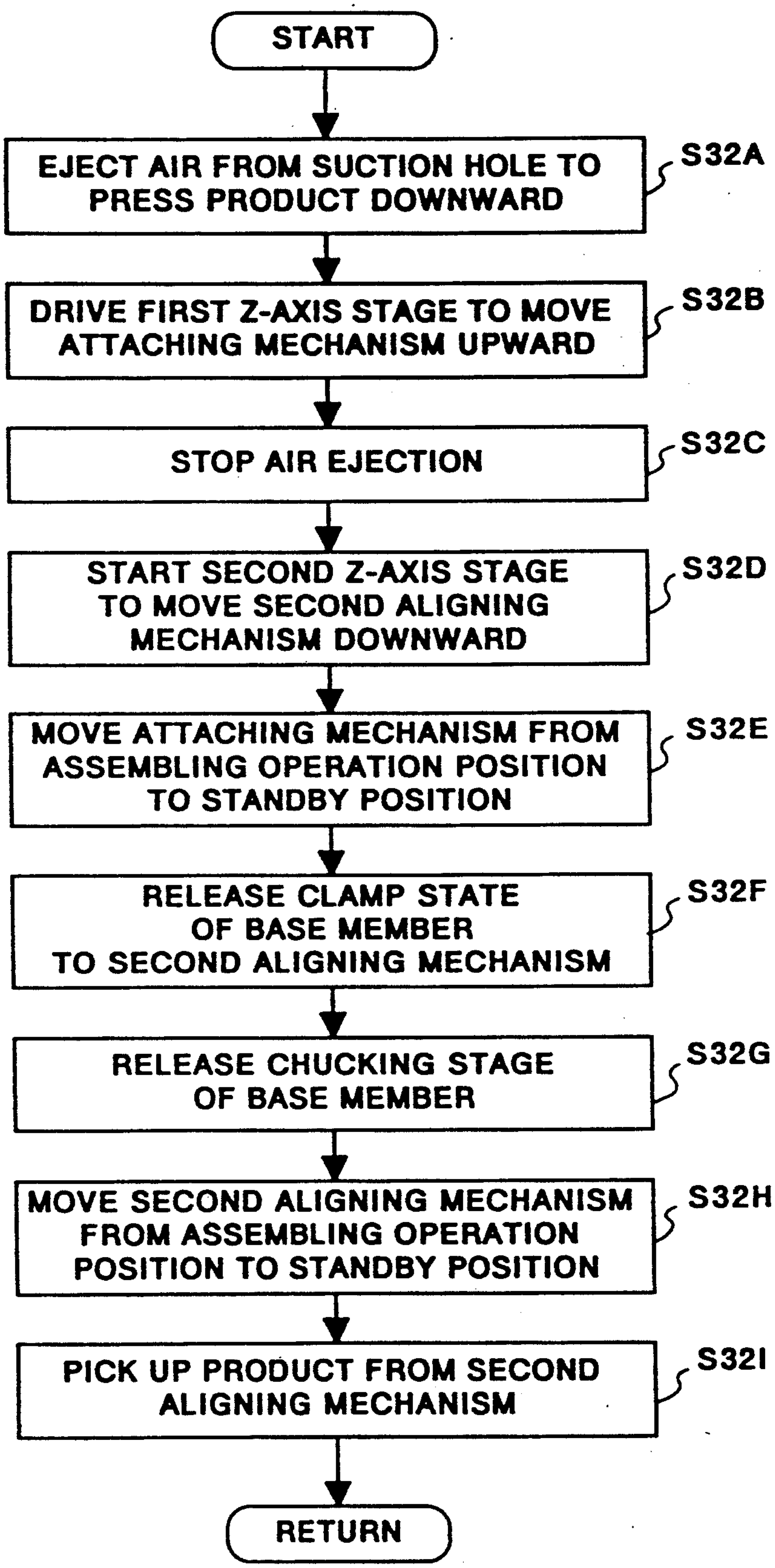
FIG. 31 is a flow chart showing a delivery operation of an assembly as a product.

The product delivery operation in step S32 will be described below with reference to the flow chart shown in FIG. 31.

In step S30 described above, the heater board 102 and the top plate 104 which are aligned with each other are adhered to each other via the adhesives 80*a* and 80*b*, thus forming an assembly as a product. When the product is finally formed, the delivery operation of the product is started.

When the delivery operation is started, the selector valves (not shown) in the first aligning mechanism 27 are switched to be connected to the positive pressure generation mechanism in step S32A. As a result, compressed air is ejected (reversely ejected) from the pair of suction holes 26*d* and 26*e*, and the assembly of the top plate 104 and the heater board 102 as the product is pressed downward. Thereafter, in step S32B, the first z-axis stage 20 is started again to move the attaching mechanism 26, i.e., the entire first aligning mechanism 27 upward, so that the ink reception port 118 attached to the upper surface of the top plate 104 is disengaged from a gap between the two suction members 26*b* and 26*c*. In this manner, the first aligning mechanism 27 is set in a desirably movable state in the horizontal plane.

Thereafter, in step S32C, the selector valves are switched to an air open position to stop the reverse ejection operation. In step S32D, the second z-axis stage 30 of the second position adjustment mechanism 16 is started to move the entire second aligning mechanism 33 downward. In step S32E, the first position adjustment mechanism 14 is started to return the entire attaching mechanism 26 from the assembling operation position $\alpha$ to the standby position.

In step S32F, the release mechanism 33D of the second aligning mechanism 33 is started to release the clamping state in the x- and y-axis directions of the base member 208. In step S32G, the driving force of the suction mechanism 33E is stopped to release the holding state of the base member 208 in the z-axis direction. In this manner, the base member 208, i.e., the heater board 104 and the top plate 102 attached on the base member 208 can be detached from the second aligning mechanism 33. Thereafter, in step S32H, the second position adjustment mechanism 16 is started to return the entire second aligning mechanism 33 from the assembling operation position to the standby position. Finally, in step S32I, the product is picked up from the second aligning mechanism 33 while holding the base member 208 of the product via a supply robot (not shown), and is conveyed to a product storage station. In this manner, a series of product delivery operations are ended, and the control returns to the main routine.

As described in detail above, when the assembling apparatus 10 of this embodiment, and the assembling method in this assembling apparatus 10 are practiced, the heater board 102 and the top plate 104 as precision components can be adhered to each other without damaging these components upon application of an excessive assembling force, while the discharge heaters 112 of the heater board 102 and the discharge orifices 106 of the top plate 104 are precisely assembled to each other with predetermined precision.

In particular, in the above embodiment, the assembling apparatus 10 can eliminate manual operations, and can achieve full-automatic operations. As a result, according to this assembling apparatus, the position adjustment precision can be kept constant depending on the processing precision of the image processor 44, thus improving reliability. A time required for aligning the top plate 104 and the heater board 102 in the x-axis direction can be shortened as much as possible basically depending on a processing time in the image processor 44, thus improving assembling efficiency. Furthermore, workers can be free from visual measurement over a long period of time, and eye strain upon radiation of ultraviolet rays, thus improving working environment.

The present invention is not limited to the arrangement of the above embodiment, and various changes and modifications may be made within the spirit and scope of the invention.

For example, in the above embodiment, the assembling apparatus 10 comprises the temporary adhering mechanism 54 for adhering the heater board 102 and the top plate 104 to each other via ultraviolet-setting adhesives after their discharge orifices 106 and the corresponding discharge heaters 112 coincide with each other, so as not to change the relative positional relationship between the heater board 102 and the top plate 104, in other words, to temporarily fix the heater board 102 and the top plate 104. The temporary adhering mechanism 54 comprises the pair of light guides 56 which are located on the two sides of the distal end portion of the attaching mechanism 26, so that their distal ends are directed toward adhesive application portions, and the ultraviolet light source 58, connected to the proximal end portions of the two light guides 56, for emitting ultraviolet rays. However, the present invention is not limited to this arrangement, and may adopt an arrangement to be described below as another embodiment.

The arrangement of the other embodiment will be described below with reference to FIGS. 32 to 34. The same reference numerals in this embodiment denote the same parts as in the above embodiment, and a detailed description thereof will be omitted.

Figure 32A:
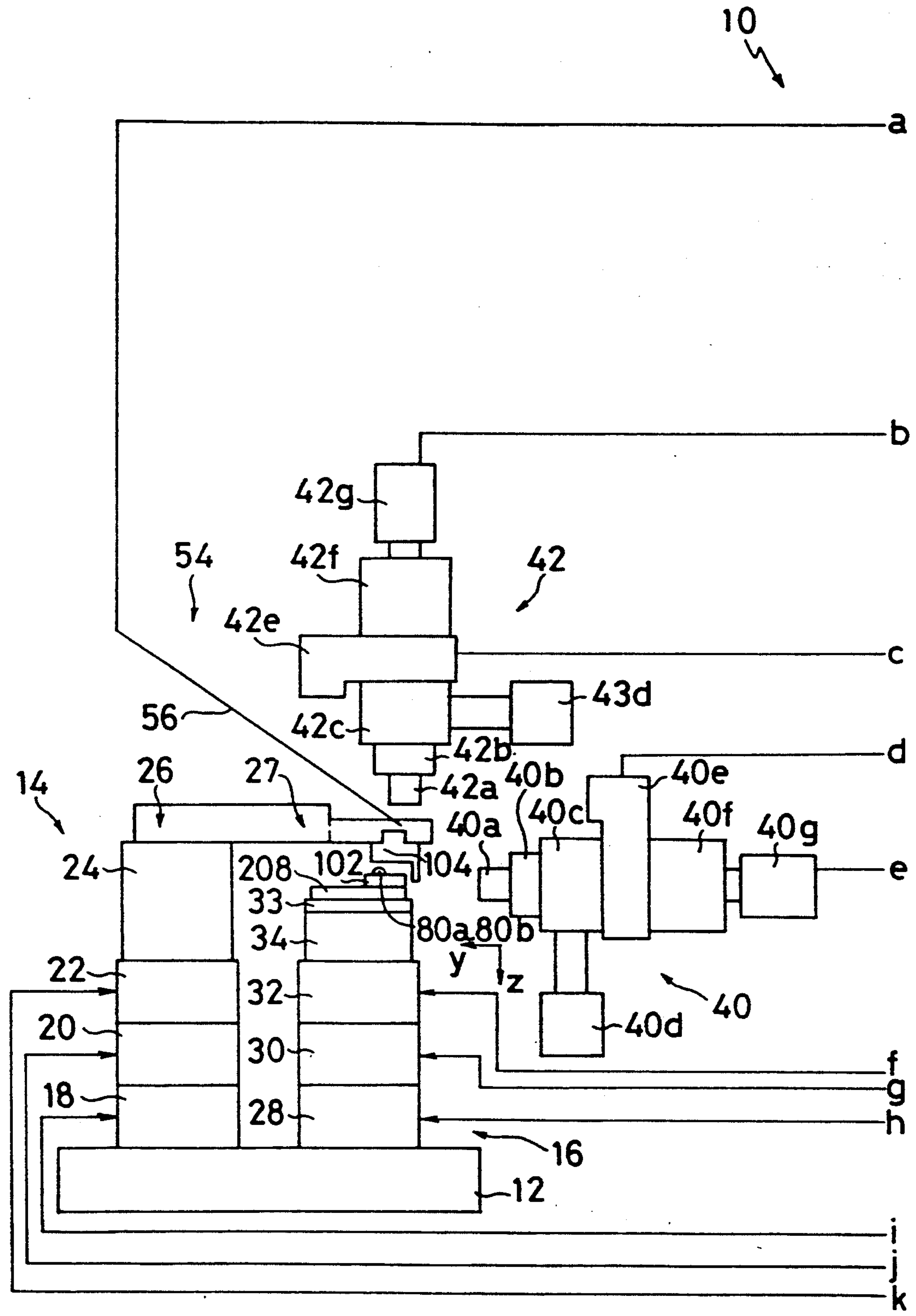
FIG. 32(*a*) is a schematic front view diagram showing an arrangement of a mechanical portion of a head nozzle of an assembling apparatus according to another embodiment of the present invention.
Figure 32B:
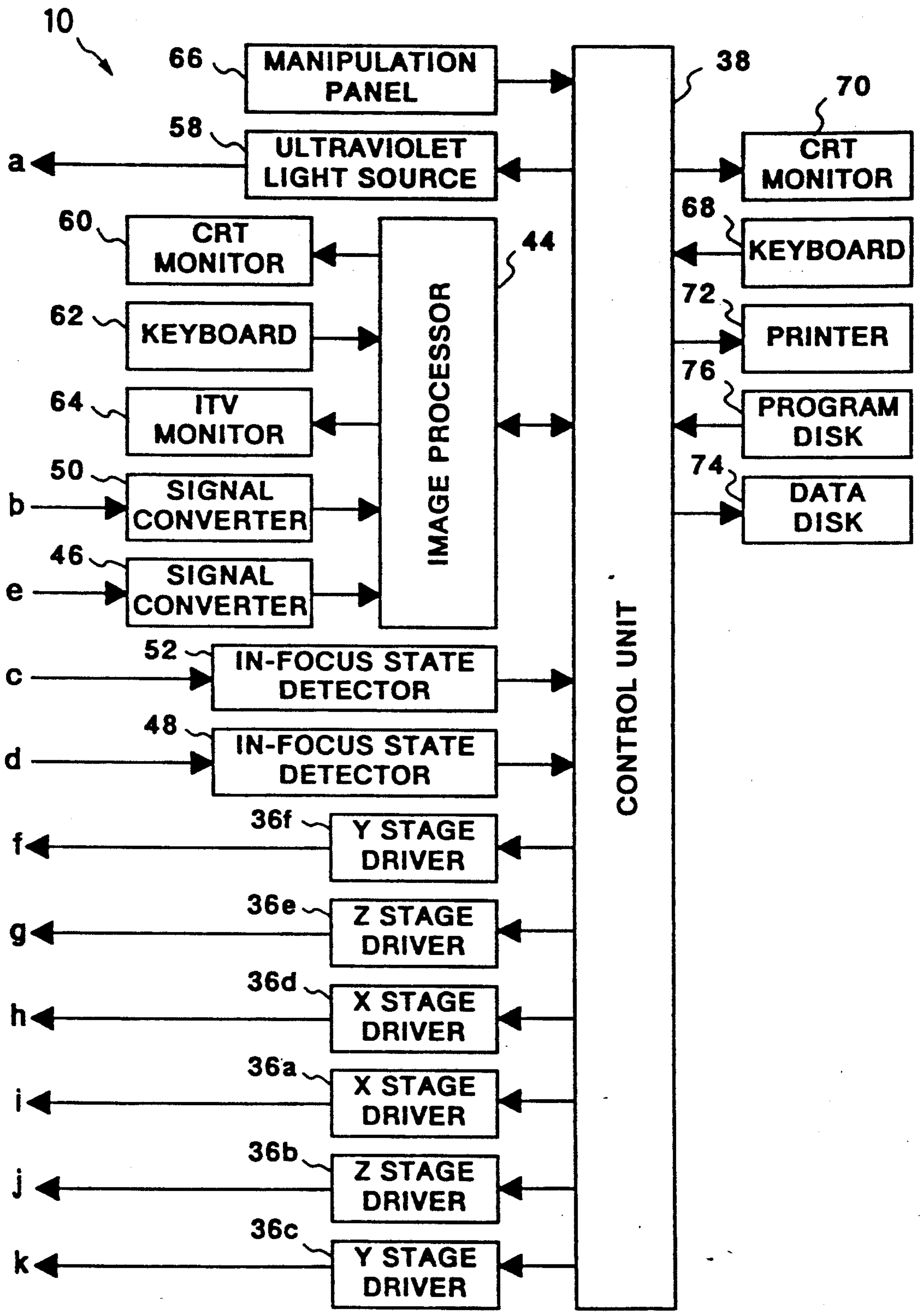

In this embodiment, the temporary adhering mechanism 54 comprises an ultraviolet light source 58 for emitting ultraviolet rays, and second light guides 56, the proximal end portions of which are connected to the ultraviolet light source 58, the distal end portions of which are attached to the side surfaces of a pair of suction members **26*b* and 26*c* arranged on the distal end portion of an attaching mechanism 26, and which are connected to first light guides 57 embedded in these suction members 26*b* and 26*c*, as shown in FIG. 32**.

The second light guides 56 are deformably formed to have flexibility so as to always connect the ultraviolet light source 58 and the first light guides 57 in correspondence with the attaching mechanism 26 based on the drive operation of a first position adjustment mechanism 14. The arranging state of the first light guides 57 will be described later with reference to FIG. 34.

Figure 33:
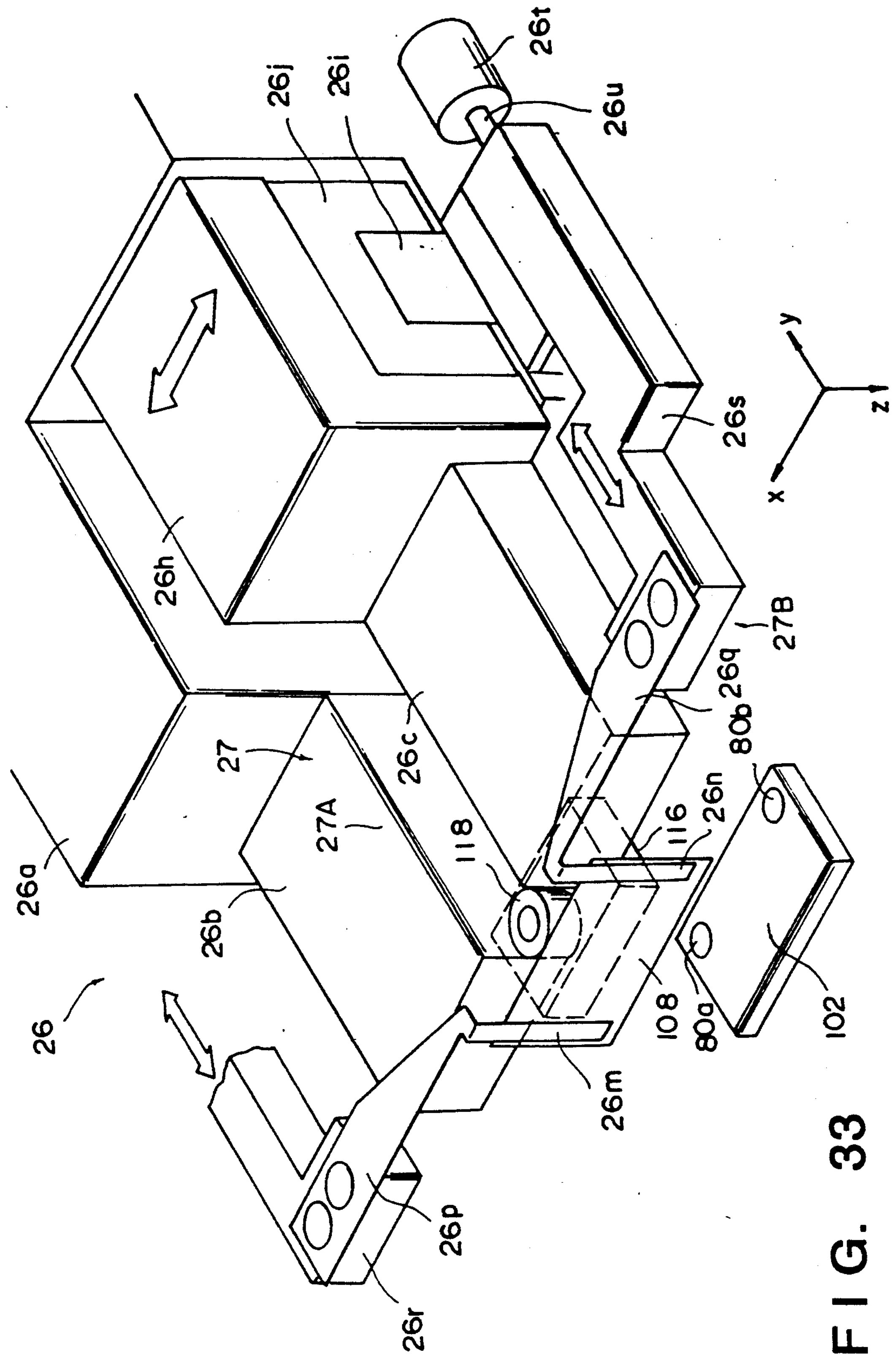
FIG. 33 is a schematic perspective view of an attaching mechanism and a first aligning mechanism in a first position adjustment mechanism in the embodiment shown in FIG. 32.
Figure 34:
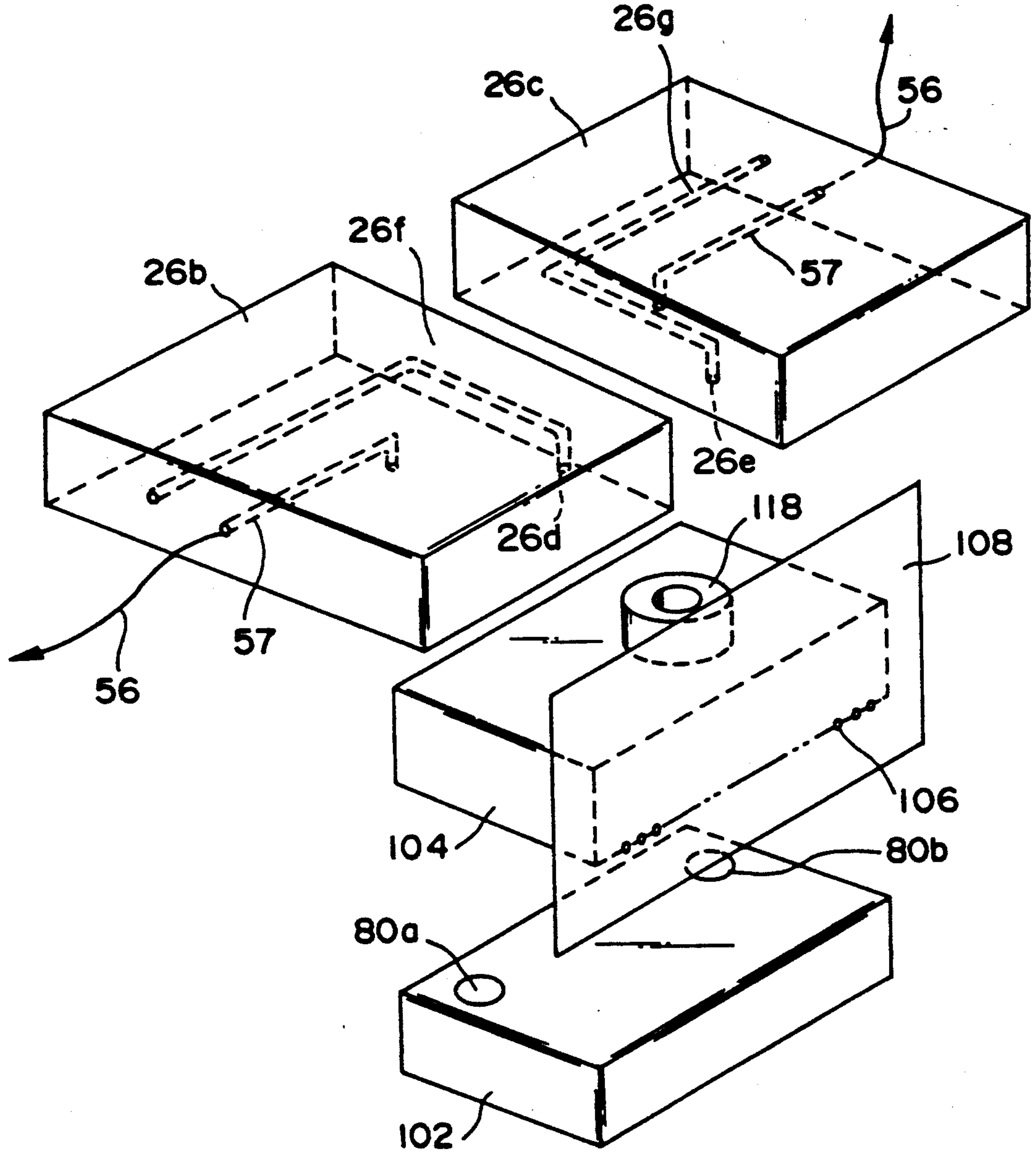
FIG. 34 is a perspective view showing an embedded state of a first light guide in a temporary adhering mechanism in the embodiment shown in FIG. 32.

In this embodiment, the attaching mechanism 26 has an arrangement shown in FIGS. 33 and 34. More specifically, the attaching mechanism 26 comprises a main body **26*a* fixed on a first y-axis stage 22 via a spacer 24 like in the above embodiment. The pair of suction members 26*b* and 26*c* are arranged with a predetermined interval therebetween on the distal end portion of the main body 26*a* to project forward (in the y-axis direction) like in the above embodiment. However, these suction members 26*b* and 26*c*** are formed of an ultraviolet non-transmission material, more specifically, a colored glass plate.

In each of the suction members **26*b* and 26*c*, as shown in FIG. 34, the first light guide 57, one end of which is open to the lower surface toward an adhesive application position (to be described later), and the other end of which is open to the side surface, is embedded. The first light guide 57 guides ultraviolet rays radiated on the other-end opening via the above-mentioned second light guide 56 to the one-end opening. More specifically, the first light guides 57 are connected to the corresponding second light guides 56 at their other-end openings. As described above, these first light guides 57 constitute the temporary adhering mechanism 54** as an adhering device as the characteristic feature of the present invention, and are formed of glass fibers capable of transmitting and guiding ultraviolet rays therethrough.

In particular, in this embodiment, the assembling apparatus 10 can eliminate manual operations, and can achieve full-automatic operations like in the above embodiment. As a result, in the assembling operation of this assembling apparatus 10, when the heater board 102 and the top plate 104 are adhered to each other after the heater board 102 as a first member and the top plate 104 as a second member are aligned with each other, more specifically, after they are aligned so that a discharge heater **112*c* on the heater board 102 and a corresponding discharge orifice 106 formed in an orifice plate 108 of the top plate 104 coincide with each other in the x-axis direction, an ultraviolet-setting adhesive is applied between these two members. The above-mentioned aligning operation is executed while the ultraviolet-setting adhesive is interposed between the heater board 102 and the top plate 104, and thereafter, ultraviolet rays are radiated in a state wherein the heater board 102 and the top plate 104 are joined at a predetermined joint force. Thus, the adhesive is set, and the heater board 102 and the top plate 104 can be adhered to each other. As a result, a worker need not hold the heater board 102 and the top plate 104**, and a position shift between these two members can be reliably prevented before the adhesive is set.

In particular, according to this embodiment, a worker is free from an operation for holding the heater board 102 and the top plate 104 for a long period of time, and need not directly see ultraviolet rays, thus eliminating eye strain. More specifically, the fatigue of workers can be reduced, and working efficiency can be improved.

In the above embodiment, the identification mark 82 is formed on the upper surface of the heater board 102. However, the present invention is not limited to this arrangement. For example, the identification mark may be formed on the front end face of the heater board 102. When the identification mark is formed on the front end face of the heater board 102, it can be detected not by the second position detection mechanism 42 but by the first position detection mechanism 40.

As many apparently widely different embodiments of the present invention can be made without departing from the spirit and scope thereof, it is to be understood that the invention is not limited to the specific embodiments thereof except as defined in the appended claims.

What is claimed is:

1. An ink-jet head assembling apparatus, which assembles a nozzle head of an ink-jet head for discharging an ink in a predetermined pattern from a heater board having a plurality of heaters for heating the ink, and a top plate member having a plurality of discharge orifices for discharging the ink heated by the corresponding heaters in a jet-like manner, said apparatus comprising:

heater board holding means for aligning the heater board to a predetermined position and holding the heater board;

first position adjustment means for adjusting a position of the heater board held by the heater board holding means, in a three-dimensional manner;

top plate member holding means for holding the top plate member;

second position adjustment means for adjusting a position of the top plate member held by the top plate member holding means, in a three-dimensional manner;

first position detection means for detecting positions of the discharge orifices of the top plate member;

second position detection means for detecting positions of the heaters on the heater board;

shift amount detection means for comparing a first detection result detected by said first position detection means with a second detection result detected by said second position detection means, and detecting a shift amount between the top plate member and the heater board;

control means for controlling said first position adjustment means and said second position adjustment means based on the detection result by said shift amount detection means, and aligning the heater board and the top plate member; and fixing means for fixing the top plate member and the heater board aligned with each other.

2. The apparatus according to claim 1, wherein said heater board holding means includes:

a holding member for generating suction for holding the heater board; and aligning means for aligning the heater board on said holding means in a two-dimensional manner, and wherein said top plate member holding means includes suction means for generating suction for holding said top plate member.

3. The apparatus according to claim 2, wherein said first and second position detection means include:

first and second photographing means for respectively photographing images of the discharge orifices and the heaters; and first and second position calculation means for respectively calculating the positions of the corresponding discharge orifices and heaters on the basis of the images photographed by said the first and second photographing means.

4. The apparatus according to claim 3, wherein said shift amount detection means includes:

calibration means for calibrating a shift between optical axes of said first and second photographing means;

position shift amount calculation means for calculating a difference between the positions of the discharge orifices and the heaters calculated by said first and second position calculation means; and final calculation means for calculating an actual shift amount between the positions of the discharge orifices and the heaters after the calculation result of said position shift amount calculation means is corrected by the shift amount of the optical axes calibrated by said calibration means.

5. The apparatus according to claim 3, wherein the heater board includes:

a board main body;

a plurality of heaters formed on the board main body; and an identification mark indicating a central one of the plurality of heaters.

6. The apparatus according to claim 5, wherein the identification mark is arranged adjacent to the central heater.

7. The apparatus according to claim 6, wherein the heaters are formed by etching on the board main body, and the identification mark is simultaneously formed by etching upon formation of the heaters.

8. The apparatus according to claim 7, wherein the identification mark is formed of the same material as that of the heaters.

9. The apparatus according to claim 1, wherein the top plate member includes:

a top plate main body which has an ultraviolet transmission characteristic, has an open bottom surface, and is placed on the heater board to close an internal space thereof, the closed internal space serving as an ink reservoir;

an orifice plate formed on a front surface of the top plate main body, and formed with the discharge orifices; and a cylindrical ink reception port, which is formed on an upper surface of the top plate main body, and through which an ink is supplied to the ink reservoir.

10. The apparatus according to claim 2, wherein said fixing means includes:

a movably supported suction member for detachably chucking and holding the top plate member;

application means for applying an ultraviolet-setting adhesive to at least one of joint surfaces of the top plate member and the heater board;

joint means for joining the top plate member and the heater board while the adhesive is interposed between the joint surfaces of the top plate member and the heater board;

light source means for emitting ultraviolet rays;

light guide means for guiding the ultraviolet rays emitted from said light source means to the adhesive applied by said application means; and control means for causing said light source means to emit the ultraviolet rays at an adhesion timing of the top plate member and the heater board, so that the ultraviolet rays are radiated on the adhesive applied to the joint surfaces between the top plate member and the heater board to set the adhesive.

11. The apparatus according to claim 10, wherein said suction member has an ultraviolet transmission characteristic, said light guide means guides the ultraviolet rays emitted from said light source means to said suction member, and the ultraviolet rays guided to said suction member are radiated on the adhesive applied by said application means upon being transmitted through said suction member.

12. The apparatus according to claim 10, wherein said suction member has an ultraviolet transmission characteristics, and said light guide means includes;

a first light guide, which is embedded in said suction member, one end of which is open to oppose an adhesive applied region of the top plate member chucked and held by said suction member, and the other end of which is open to another surface of said suction member, for guiding the ultraviolet rays radiated on the other end to the one end; and a second light guide for guiding the ultraviolet rays emitted from said light source means to the other end of said first light guide embedded in said suction member.

13. An ink-jet head assembling method, which assembles a nozzle head of an ink-jet head for discharging an ink in a predetermined pattern from a heater board having a plurality of heaters for heating the ink, and a top plate member having a plurality of discharge orifices for discharging the ink heated by the corresponding heaters in a jet-like manner, said method comprising the steps of:

a first holding step of holding the heater board on first position adjustment means for adjusting a position of the heater board in a three-dimensional manner;

a second holding step of holding the top plate member on second position adjustment means for adjusting a position of the top plate member in a three-dimensional manner;

a first aligning step of aligning the heater board to a predetermined first assembling position, by the first position adjustment means;

a first shift amount detection step of detecting a first shift amount of the heater board position from a predetermined reference position in a z-axis direction;

a first position adjustment step of adjusting the position of the heater board in the z-axis direction by the first position adjustment means to minimize the first shift amount;

a placement step of moving the top plate member by the second position adjustment means to a second assembling position immediately above the first assembling position, and placing the top plate member on the heater board;

a second shift amount detection step of detecting a second shift amount between the heater board and the top plate member in an x-axis direction;

a second position adjustment step of adjusting the positions of the heater board and the top plate member by the first position adjustment means and the second position adjustment means to eliminate the second shift amount; and a fixing step of fixing the heater board and the top plate member position adjusted in the second position adjustment step.

14. The method according to claim 13, wherein said fixing step includes:

a supply step of supplying an adhesive for adhering the heater board to the top plate member; and a press-joint step of press-jointing the heater board and the top plate member to be adhered by the adhesive.

15. The method according to claim 14, wherein the press-joint step includes steps of guiding ultraviolet rays emitted from an ultraviolet light source separated from an adhesion position to an adhesive application position via a light guide, and radiating the ultraviolet rays onto the adhesive.

16. The method according to claim 15, wherein the top plate member is formed to have an ultraviolet transmission characteristic, said light guide is terminated at a surface of the top plate member, and the ultraviolet radiation step includes a step of radiating the ultraviolet rays onto the adhesive through the top plate member having the ultraviolet transmission characteristic.

17. An ink-jet head assembling method, which assembles a nozzle head of an ink-jet head for discharging an ink in a predetermined pattern from a heater board comprising a plurality of heaters for heating the ink, and a top plate member, which comprises, on a front surface thereof, an orifice plate formed with a plurality of discharge orifices for discharging the ink heated by the corresponding heaters in a jet-like manner, said method comprising the steps of:

a first detection step of photographing an upper surface of the heater board, and detecting positions of the heaters on the basis of photographed image information;

a focusing step of photographing a front surface of the heater board, and setting the photographed image in an in-focus state;

an offset step of moving the heater board backward from an in-focus position by a distance corresponding to a thickness of the orifice plate;

a moving step of moving the top plate member to a position above the offset heater board;

a dropping step of dropping the top plate member onto the heater board;

a drawing step of drawing the top plate member while sliding the top plate member and the heater board relatively, so that a rear surface of the orifice plate of the top plate member is in tight contact with the front surface of the heater board;

a second detection step of photographing a front surface of the orifice plate while the rear surface of the orifice plate is in tight contact with the front surface of the heater board, and detecting the positions of the discharge orifices on the basis of the photographed image information;

a position adjustment step of moving the heater board and the top plate member on the basis of the position information detected in said first and second detection steps, so that the positions of the heaters and the discharge orifice coincide with each other; and an adhesion step of adhering the top plate member and the heater board, aligned with each other in the position adjustment step, to each other.

18. The method according to claim 17, which further comprises a second focusing step, executed between said drawing step and said second detection step, of setting the image of the front surface of the orifice plate in an in-focus state.

19. An ink-jet head assembling method, which assembles a nozzle head of an ink-jet head for discharging an ink in a predetermined pattern from a heater board having a plurality of heaters for heating the ink, and a top plate member having a plurality of discharge orifices for discharging the ink heated by the corresponding heaters in a jet-like manner, said method comprising the steps of:

a first moving step of moving a calibration member having a reference point to a photographable position by first and second cameras;

a first photographing step of photographing the reference point of the calibration member by the first camera;

a first calibration step of measuring a first distance from a reference line on a frame of the first camera to the reference point on the basis of image information photographed in said first photographing step;

a second photographing step of photographing the reference point of the calibration member by the second camera;

a second calibration step of measuring a second distance from a reference line on a frame of the second camera to the reference point on the basis of image information photographed in said second photographing step;

a first calculation step of calculating a calibration distance as a shift amount between optical axes of the first and second cameras on the basis of a difference between the first and second distances;

a holding step of holding the heater board on a first position adjustment means for adjusting the position of the heater board in a three-dimensional manner;

a top plate holding step of holding the top plate member on a second position adjustment means for adjusting the position of the top plate member in a three-dimensional manner;

a supply step of supplying an adhesive for adhering the heater board to the top plate member;

a second moving step of controlling the first position adjustment means to move the heater board to the photographable position by the first and second cameras;

a third photographing step of photographing the heaters of the heater board by the first camera;

a first measurement step of measuring a first separation distance from a predetermined basic line to a predetermined heater on the heater board on the basis of image information photographed in said third photographing step;

a placement step of moving the top plate member to a position above the heater board by the second position adjustment means, and placing the top plate member on the heater board;

a fourth photographing step of photographing the discharge orifices of the top plate member by the second camera;

a second measurement step of measuring a second separation distance from the basic line to a predetermined discharge orifice of the top plate member on the basis of image information photographed in said fourth photographing step;

a second calculation step of adding the calibration distance calculated in the first calculation step to the difference between the first and second separation distances measured in said first and second measurement steps to calculate an absolute separation distance between the heater board and the top plate member;

a position adjustment step of adjusting the positions of the heater board and the top plate member on the basis of the absolute separation distance obtained in said second calculation step; and a press-joint step of press-jointing the heater board and the top plate member to be adhered by the adhesive.

20. The method according to claim 19, wherein the basic line is defined as a central line in a photographed image, the predetermined heater is defined by a central one of a plurality of photographed heaters, and the predetermined discharge orifice is defined by a central one of a plurality of photographed orifices.

21. The method according to claim 19, wherein the reference point is defined as a predetermined corner of the calibration member, and the reference line is defined by an edge in an image obtained by photographing the calibration member.

22. An ink-jet head assembling apparatus, which assembles a nozzle head of an ink-jet head for discharging an ink in a predetermined pattern from a heater board having a plurality of heaters for heating the ink, and a top plate member having a plurality of discharge orifices for discharging the ink heated by the corresponding heaters in a jet-like manner, said apparatus comprising:

heater board holding means for aligning the heater board to a predetermined position and holding the heater board;

top plate member holding means for holding the top plate member;

first position detection means for detecting positions of the discharge orifices of the top plate member;

second position detection means for detecting positions of the heaters on the heater board;

shift amount detection means for detecting a shift amount between the top plate member and the heater board by comparing a first detection result detected by said first position detection means with a second detection result detected by said second position detection means;

a first position adjustment means for adjusting the position of the heater board and the position of the top plate member in a direction in which the heaters are arranged on the basis of the shift amount detected by said shift amount detection means;

a camera for photographing the heater board;

first focus detection means for detecting a first position of said camera at which a front end surface of the heater board focuses on said camera;

second position adjustment means for adjusting the top plate member with respect to the heater board in a thickness direction of the orifice plate;

calculation means for calculating a second position of the camera at which a surface of the orifice plate focuses when the heater board and the top plate member are assembled, by adding thickness information of an orifice plate attached to a front face of the top plate member to the first position information detected by said focus detection means; and confirmation means for confirming that the orifice plate is attached to the front end surface of the heater board, by moving said camera to the second position and photographing the orifice plate.

23. The apparatus according to claim 22, wherein said second position adjustment means includes:

an engaging member for engaging with a front face of the orifice plate; and moving means for moving said engaging member in the thickness direction of the orifice plate.

24. A method of assembling an ink-jet head having an offset function, which assembles a nozzle head of an ink-jet head for discharging an ink in a predetermined pattern from a heater board having a plurality of heaters for heating the ink, and a top plate member having a plurality of discharge orifices for discharging the ink heated by the corresponding heaters in a jet-like manner, said method comprising the steps of:

a heater board holding step of holding the heater board on first position adjustment means for adjusting a position of the heater board in a three-dimensional manner;

a top plate holding step of holding the top plate member on a second position adjustment means for adjusting the position of the top plate member in a three-dimensional manner;

a measurement step of measuring a distance from a front end surface of the heater board to a predetermined reference position, said measuring step including a first shift amount calculation step of calculating a first shift amount between a predetermined reference heater of the plurality of heaters and an assembling reference position;

an offset step of adding thickness information of the orifice plate to the first shift amount obtained in said measurement step, and offsetting the measurement information;

a second shift amount calculation step of calculating a second shift amount between a reference position of the heater board and a reference position of the top plate member on the basis of information obtained in said measurement step and information obtained in said offset step;

a correction step of controlling the first position adjustment means and second position adjustment means to correct the second shift amount between the heater board and the top plate member; and a fixing step of fixing the heater board and the top plate member.

* * * * *

UNITED STATES PATENT AND TRADEMARK OFFICE
CERTIFICATE OF CORRECTION

PATENT NO. : 5,243,755

DATED : September 14, 1993

INVENTOR(S) : MASAKI INABA, ET AL.

It is certified that error appears in the above-identified patent and that said Letters Patent is hereby corrected as shown below:

On the Title Page;

IN [75] INVENTORS

"Kanagawa" should read --Kamakura--.

COLUMN 1

Line 20, "heaters toward," should read --heaters, toward--.

COLUMN 2

Line 14, "clogg" should read --clog--.

COLUMN 8

Line 54, "via" (first occurrence) should be deleted.

COLUMN 9

Line 56, "Unit 27" should read --Unit 27B--.

COLUMN 10

Line 35, "26A." should read --27A.--.
Line 37, "26B." should read --27B.--.

COLUMN 18

Line 17, "$\Delta$s." should read --$\Delta$x.--.

COLUMN 21

Line 31, "step S220," should read --step S220--.

UNITED STATES PATENT AND TRADEMARK OFFICE

CERTIFICATE OF CORRECTION

PATENT NO. : 5,243,755

DATED : September 14, 1993

INVENTOR(S) : MASAKI INABA, ET AL.

It is certified that error appears in the above-identified patent and that said Letters Patent is hereby corrected as shown below:

COLUMN 24

Line 36, "this" should read --the--.

COLUMN 30

Line 62, "teristics," should read --teristic,-- and "includes;" should read --includes:--.

COLUMN 32

Line 41, "orifice" should read --orifices--.

Signed and Sealed this

Twenty-first Day of June, 1994

Attest:

BRUCE LEHMAN

Attesting Officer

Commissioner of Patents and Trademarks